(12) United States Patent
Gavish

(10) Patent No.: US 12,483,186 B2
(45) Date of Patent: Nov. 25, 2025

(54) FLOATING PLATFORM FOR SOLAR PANEL ARRAYS

(71) Applicant: Guy Gavish, Tel-Aviv (IL)

(72) Inventor: Guy Gavish, Tel-Aviv (IL)

( * ) Notice: Subject to any disclaimer, the term of this patent is extended or adjusted under 35 U.S.C. 154(b) by 0 days.

(21) Appl. No.: 18/265,970

(22) PCT Filed: Dec. 22, 2021

(86) PCT No.: PCT/IL2021/051520
§ 371 (c)(1),
(2) Date: Jun. 8, 2023

(87) PCT Pub. No.: WO2022/137235
PCT Pub. Date: Jun. 30, 2022

(65) Prior Publication Data
US 2024/0048089 A1    Feb. 8, 2024

Related U.S. Application Data

(60) Provisional application No. 63/129,391, filed on Dec. 22, 2020.

(51) Int. Cl.
*H02S 20/30* (2014.01)
*B63B 35/44* (2006.01)

(52) U.S. Cl.
CPC .............. *H02S 20/30* (2014.12); *B63B 35/44* (2013.01); *B63B 2035/4453* (2013.01)

(58) Field of Classification Search
CPC ............................................. B63B 2035/4453
See application file for complete search history.

(56) References Cited

U.S. PATENT DOCUMENTS

| 4,906,359 A | * | 3/1990 | Cox, Jr. | F24S 20/70 |
| | | | | 261/120 |
| 2013/0146127 A1 | * | 6/2013 | Lunoe | F24S 20/70 |
| | | | | 136/251 |
| 2014/0196769 A1 | * | 7/2014 | Schoop | F24S 25/615 |
| | | | | 136/251 |

(Continued)

FOREIGN PATENT DOCUMENTS

| CN | 102792102 A | 11/2012 | |
| KR | 101604946 B1 | * 3/2016 | ............. H02S 20/30 |

OTHER PUBLICATIONS

English machine translation of Shin (KR 10-1604946 B1) provided by the EPO website, 2024, All Pages. (Year: 2024).*

(Continued)

*Primary Examiner* — Daniel P Malley, Jr.
(74) *Attorney, Agent, or Firm* — Naomi S. Rosenman-Helfand

(57) ABSTRACT

The invention provides a floating platform for solar panel arrays, comprised of at least one modular unit, comprising: a photovoltaic solar panel array; a pair of essentially triangular floats, having an angled upper side, for supporting said photovoltaic solar panel array at an angle; support bars connected above said floats and perpendicular to said angled upper side of said floats, supporting said photovoltaic solar panel array above said floats.
In some embodiments, the float may have an angled underside to provide buoyancy and rocking movement upon water. In some embodiments, the float is made of closed cell polyethylene foam.

26 Claims, 45 Drawing Sheets

(56) References Cited

U.S. PATENT DOCUMENTS

| | | | |
|---|---|---|---|
| 2017/0040926 A1 | 2/2017 | Smadja et al. | |
| 2018/0001975 A1* | 1/2018 | Jaramillo | F24S 25/16 |
| 2018/0119994 A1* | 5/2018 | Helming | F24S 20/70 |
| 2018/0238563 A1 | 8/2018 | Stepa et al. | |
| 2019/0120525 A1 | 4/2019 | Morris | |
| 2021/0036653 A1* | 2/2021 | Lee | F24S 25/37 |
| 2021/0058022 A1* | 2/2021 | Forrest | H02S 40/22 |
| 2022/0176220 A1* | 6/2022 | Gallagher | A63B 69/14 |
| 2022/0411026 A1* | 12/2022 | Chellakat | B63B 35/44 |
| 2023/0019361 A1* | 1/2023 | Van De Ven | B63B 35/44 |

OTHER PUBLICATIONS

APP Manufacturing, "U-Bolt 101: The Simple Facts", https://www.appmfg.com/blog/u-bolt-101-the-simple-facts, All Pages, 2019. (Year: 2019).*

English machine translation of Shin (KR-101604946-B1) provided by the EPO website, All Pages, 2025. (Year: 2025).*

\* cited by examiner

FIG. 1 - PRIOR ART
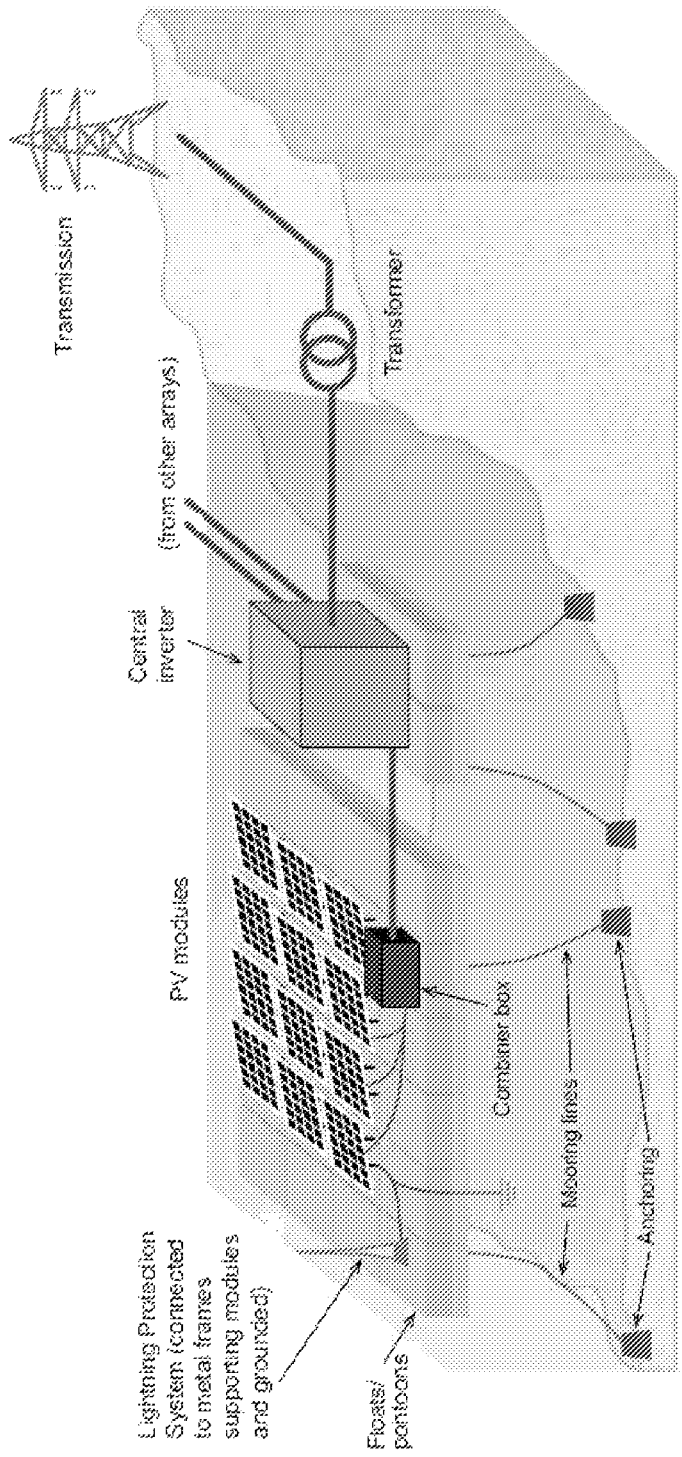

FIG. 2 - PRIOR ART
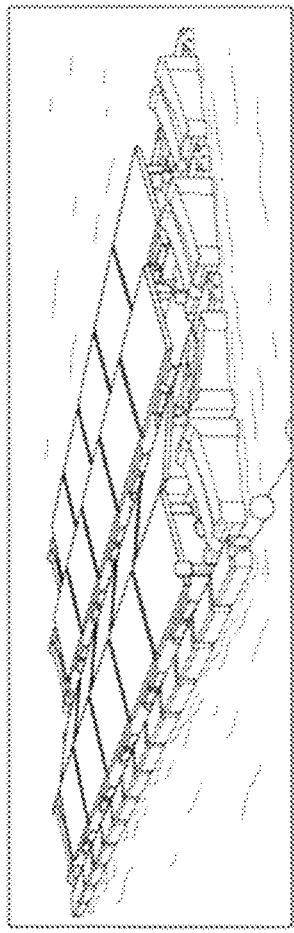
FIG. 2A: Pure Float
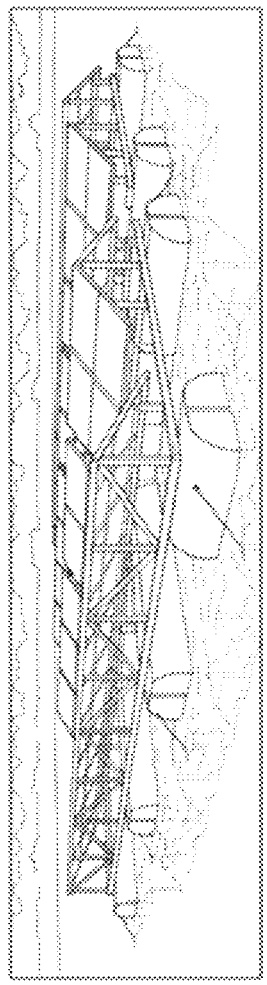
FIG. 2B: Pontoon and Metal Structure:

FIG. 3 - PRIOR ART
3A
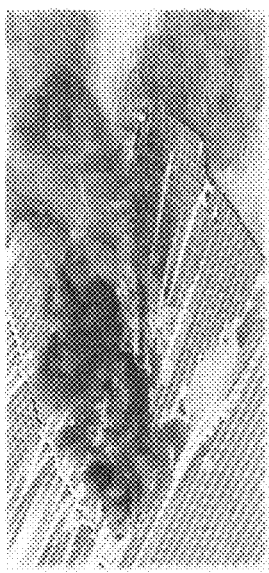
3B
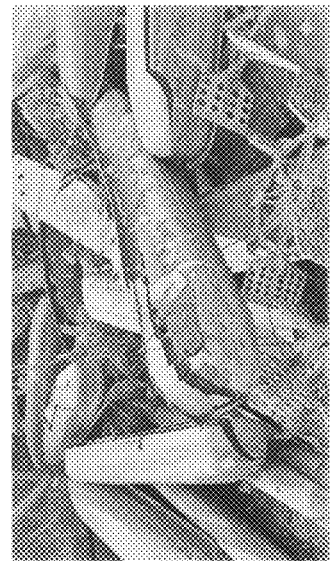
3C

FIG. 5

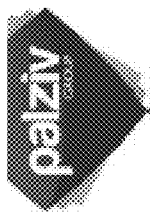

Last Update: 5 May, 2014

PA45 Technical Data Sheet

| Test | Standard | Result | Measured Unit |
|---|---|---|---|
| Density | ISO 845 | 45 | Kg/m³ |
| Tensile strength | ISO 1798 | 448 | kPa |
| Elongation | ISO 1798 | 227 | % |
| Compression 10% | ISO 844 | 83 | kPa |
| Compression 25% | ISO 844 | 100 | kPa |
| Compression 50% | ISO 844 | 169 | kPa |
| Compression Set 25% 0.5H | ISO 1856 | 7 | % |
| Compression Set 25% 24H | ISO 1856 | 2 | % |
| Compression Set 50% 0.5H | ISO 1856 | 21 | % |
| Compression Set 50% 24H | ISO 1856 | 9.5 | % |
| Working Temperature Range | Internal | -80 180 | °C |
| Water Absorption %Vol (max) | Internal | 1 | % |
| Thermal Conductivity at 10C | ASTM C177 | 0.044 | W/mK |
| Thermal Conductivity at 40C | ASTM C177 | 0.046 | W/mK |
| Shore | ISO 868 | 61 | 00 |
| Flammability | FMVSS302 | 43 | mm/min |

Polifoam is a closed cell cross-linked polyethylene foam block.
Tolerances other than the above may be negotiated.
Dimensional stability 24 hr at 70C < 2%
Dimensional stability 24 hr at 90C < 5%
If holes were created during the foaming process, no more than 5 holes of diameter 2mm per 1m2 sheet are acceptable.
This information on Polifoam chemically cross-linked polyethylene foam is presented to the best of our knowledge.

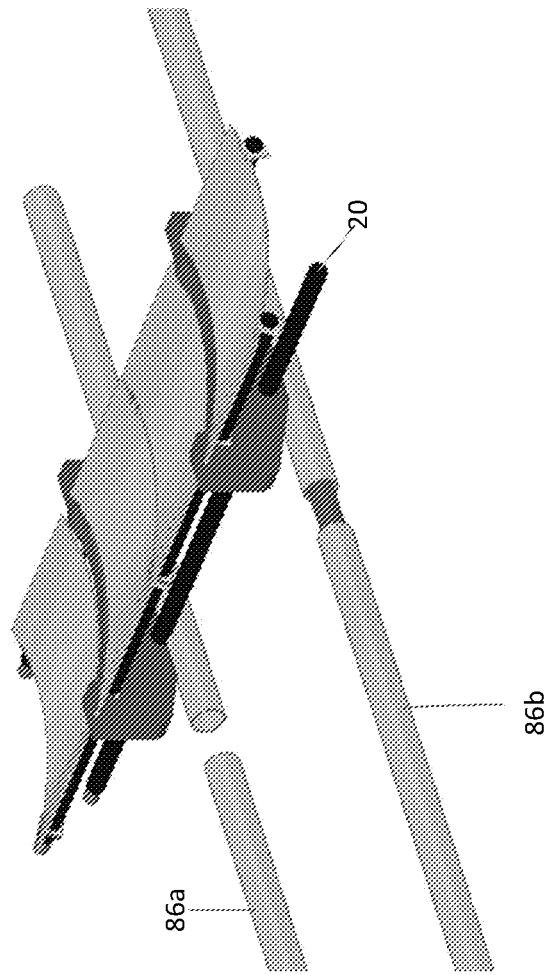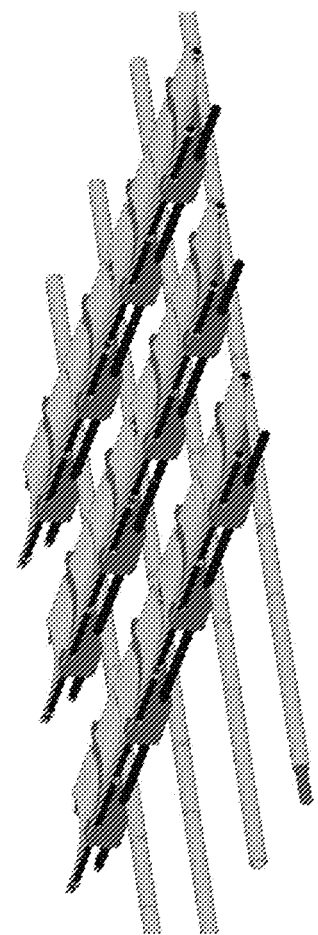
FIG. 17A
FIG. 17B

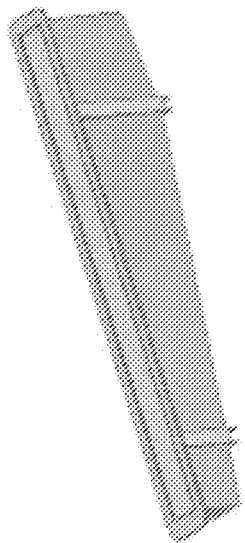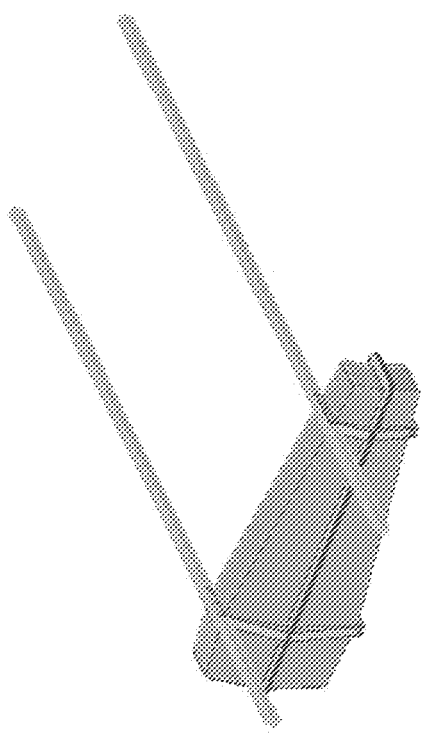
FIG. 35

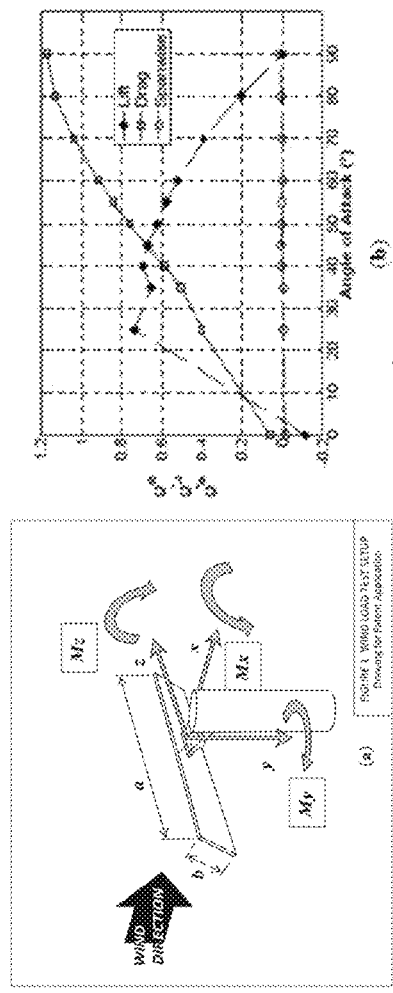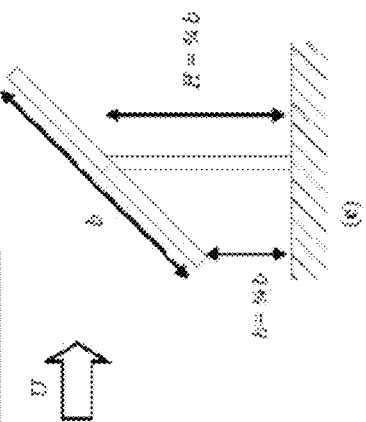
FIG 38
Figure 2. (a) Experimental stand showing a flat plate of $AR = 3.98$, (b) force coefficients as FIG 40
a
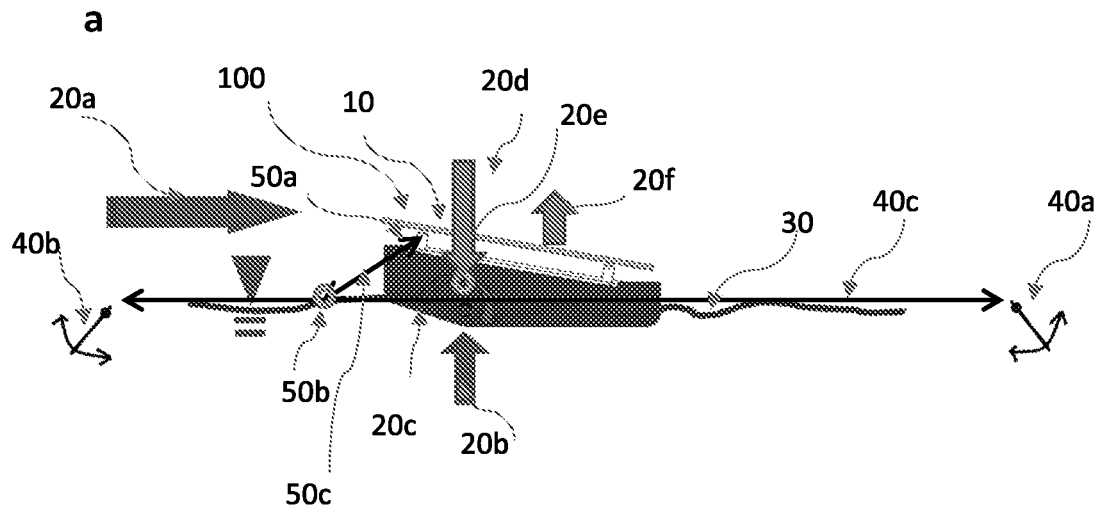
b
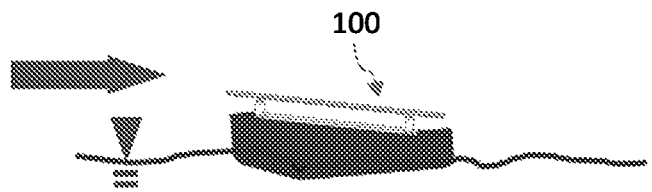
c
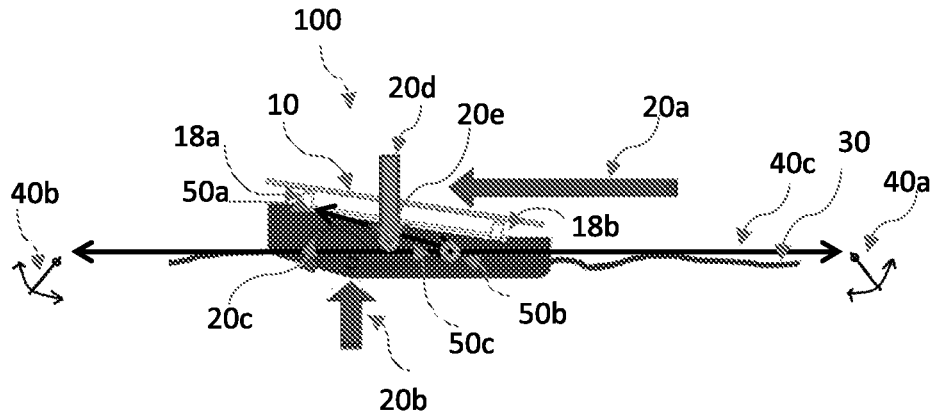
d
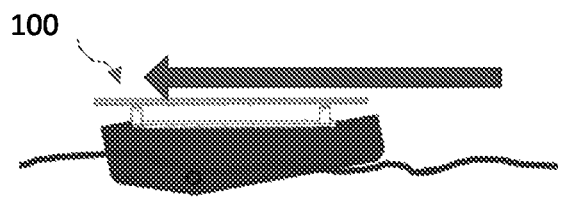

FIG 41
a
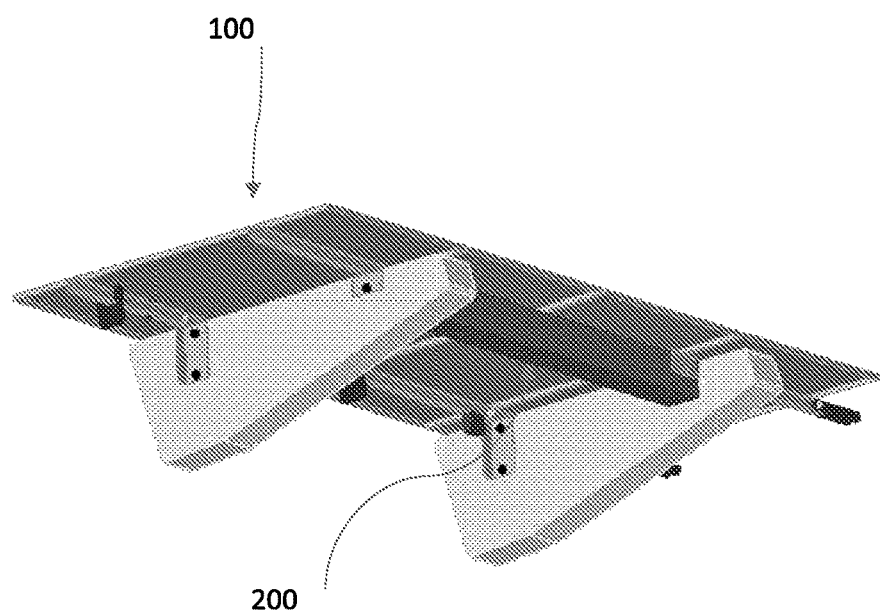
b
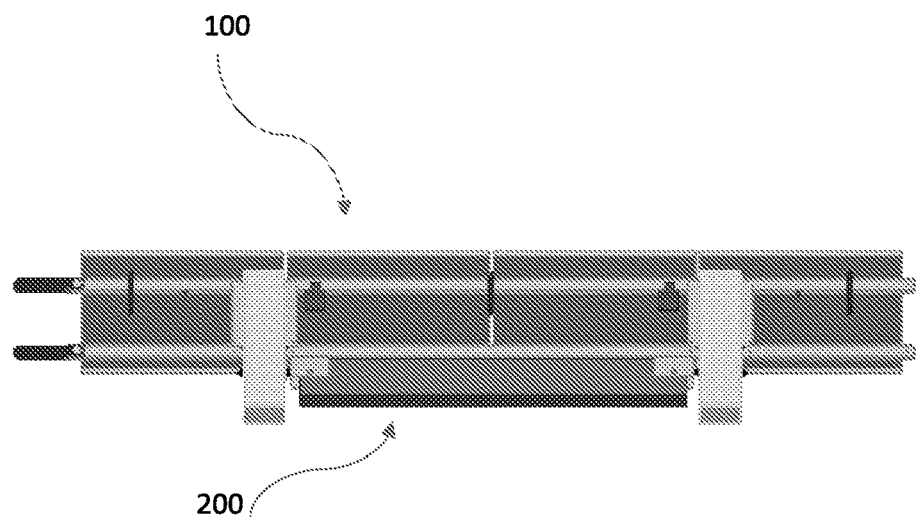

a b

FIG 41
a
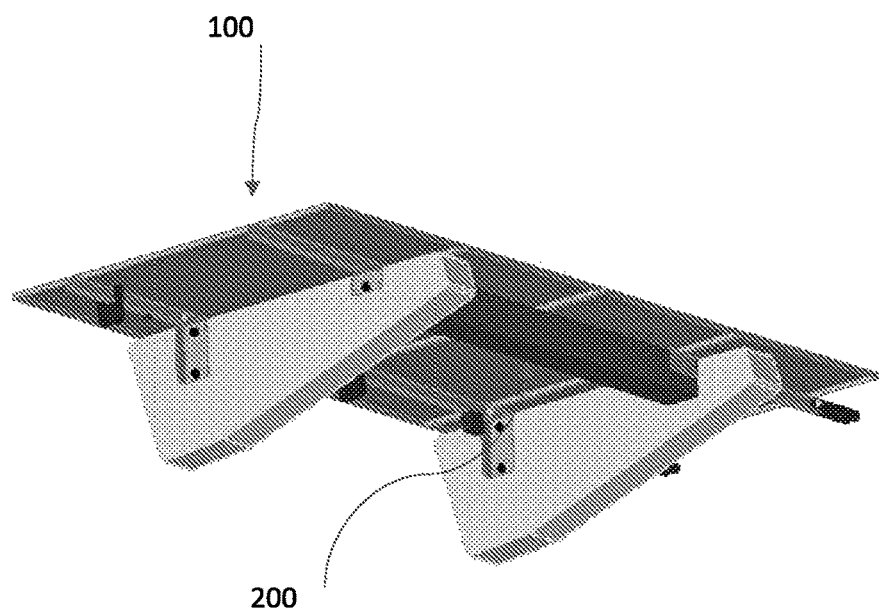
b
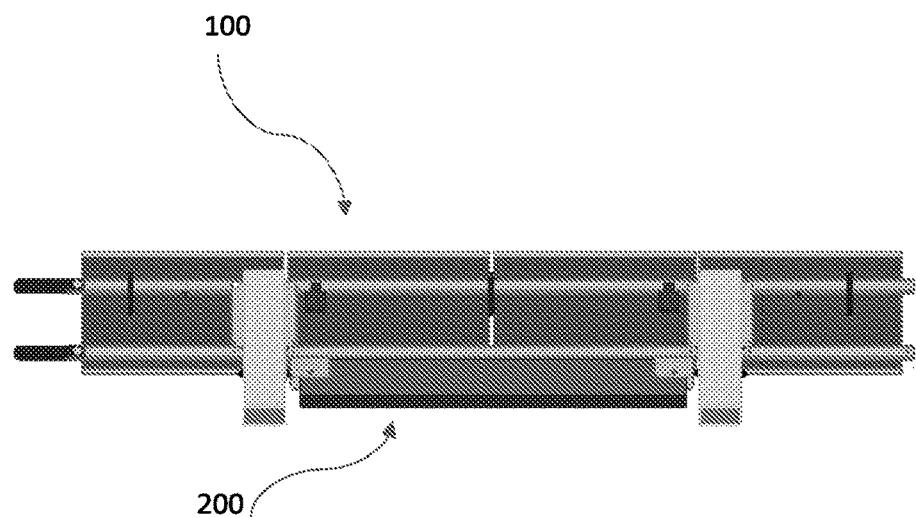

FLOATING PLATFORM FOR SOLAR PANEL ARRAYS

FIELD OF THE INVENTION

The invention pertains generally to solar energy, and pertains more particularly, to a floating platform for photovoltaic arrays, useful for deployment upon water bodies. In some embodiments, the platform may be deployed on flat roofs or agricultural fields.

BACKGROUND

Solar energy may be converted into electrical power in sunny countries. In areas where land is at a premium, it has become common practice to install solar panels upon rooftops, for homeowner use in heating water or generating electricity. Another locale which may be utilized is in agricultural fields.

Another locale which may be utilized for generation of solar energy, is upon bodies of water. Such bodies of water may be man-made or natural lakes, irrigation reservoirs, fish farms, canals or upon the open sea.

Floating photovoltaic solar arrays have several advantages over ground-mounted solar arrays including up to 80% reduction of evaporation and of algae growth in the water; the water cools the panels providing 5-15% more energy efficiency; energy is generated where it is needed for use (many ponds are near urban areas, where land is scarce).

Open-top water reservoirs holding water defined "for agricultural use", may provide large areas upon which floating photovoltaic arrays may be deployed. Wind currents are significant over time and season, so that floating panels need to be properly anchored, and need to be resistant to the effects of the harsher elements.

An array of multiple photovoltaic (PV) modules is used to absorb sunlight. The PV modules are made of multiple interconnected PV cells. The cells convert solar energy into direct-current electricity. PV modules are sometimes called solar panels. PV modules are conveniently sized and packaged in weather-resistant housings for easy installation and deployment.

Prior Art FIG. 1 shows key components of a large scale floating PV system for generation of electricity.
(PhotoSource: https://documents1.worldbank.org/curated/en/579941540407455831/pdf/Floati ng-Solar-Market-Report-Executive-Summary.pdf).

Prior Art FIG. 2 shows deployment structures that allow the platform to float upon a water reservoir. Prior art FIG. 2A includes a simplified float, and Prior Art FIG. 2B includes a more complex structure including pontoons and metal structure.
(PhotoSource: https://documents1.worldbank.org/curated/en/579941540407455831/pdf/Floati ng-Solar-Market-Report-Executive-Summary.pdf).

A walkway platform may be added if desired.

In Prior Art structures, the float is typically made of HDPE, or other plastics, and is manufactured by blow molding or mold injection. Such prior art floats require an extensive quantity of HDPE to float the weight of the PV arrays. Attempts have been made to lower costs by generating thin-walled floats with less HDPE material and less float volume.

Prior art floats formed of blow-molded plastics, degrade relatively rapidly, due to material fatigue caused by lengthy exposure to UV rays from constant sunlight, which induces depolymerization.

Prior Art FIG. 3C shows degradation of prior art floats after 5-7 years of use in a freshwater fishpond. Prior art floats suffer from punctures, due to (1) microcracks made by UV and harmonic wind or thermal loads; (2) damage during grounding of the entire structure (grounding is periodically required for fish collection and maintenance); or (3) direct wind force damage. Puncture of a lengthened pontoon may lead to sinkage of an entire array and catastrophic failure.

To avoid sinkage, attempts have been made to fill the lumen of plastic floats, with foamed polyurethane. In such case, even if the outer pontoon is damaged, the inner PU will ensure floatation. However, this solution is costly and cannot prevent long term water absorption. Other solutions have been to divide the main floater to many sub-floaters, however this too is costly and cannot prevent long term water absorption of each floater, followed by eventual sinkage of the entire array structure.

Other disadvantages of prior art floats are their fragility during storms. Wind forces tend to blow apart entire arrays. The structures are typically rigid, and interconnected, so that wind effect is not limited to a single small area. Rather, as shown in Prior Art FIG. 3A, lifting of one area of panels due to wind, will induce jarring of, and impact upon, adjacent solar panel arrays. As shown in Prior Art FIG. 3B, wind causes fracture over large areas, followed by extensive electrical fires from shorting of the electrical cables that typically carry the current generated by the panels.

It is an object of the present invention to provide an improved floating platform for photovoltaic arrays, which overcomes the disadvantages of the prior art. The platform has low cost, improved resistance to wind, lasts significantly longer, and has improved buoyancy provided at least by the shape of the float and the material selection. The platform additionally provides significant improvement in solar energy efficiency, as the solar panels are angled at a higher angle relative to the horizon, to absorb more sunlight than prior art solutions. These and other advantages of the invention are enlarged upon in the detailed description hereinbelow.

In some embodiments, the structure may be deployed upon rooftops, or upon agricultural fields.

SUMMARY OF THE INVENTION

In a general overview of the invention, the present invention provides a modular floating platform for photovoltaic solar arrays, for deployment upon a body of water. The platform utilizes floats of a novel shape and material, which grant the float longevity and maximal stability in response to wind forces, waves and water current. The float shape provides improved solar efficiency, as the angle of the panel is raised at a relatively acute angle from the horizon, allowing the panels to absorb more sunlight in comparison to previously known systems, which are typically angled at a lower angle relative to the horizon in order to lower their wind resistance.

In another embodiment, the modular units of the invention may be deployed upon roofs or upon land.

BRIEF DESCRIPTION OF THE FIGURES

The present invention is illustrated by way of example in the figures of the accompanying drawings, in which like references indicate similar elements and in which:

Prior Art FIG. 1 is a figure showing key components of a large scale floating PV system for generation of electricity.

Prior Art FIG. 2A includes a simplified float, and Prior Art FIG. 2B includes a more complex structure including pontoons and metal structure.

Prior Art FIG. 3A shows lifting of panels due to wind resulted in impact upon adjacent panels.

Prior Art FIG. 3B shows extensive electrical fires from shorting of the electrical cables.

Prior Art FIG. 3C shows degradation of prior art floats.

FIG. 4A illustrates a sideview of a single modular unit 100, that forms the floating platform of the invention.

FIG. 4B illustrates the modular unit of the invention rocking upon waves in response to wind force.

FIG. 5 shows the technical specifications of a presently preferred PE foam used for the float of the invention.

Figure 6:
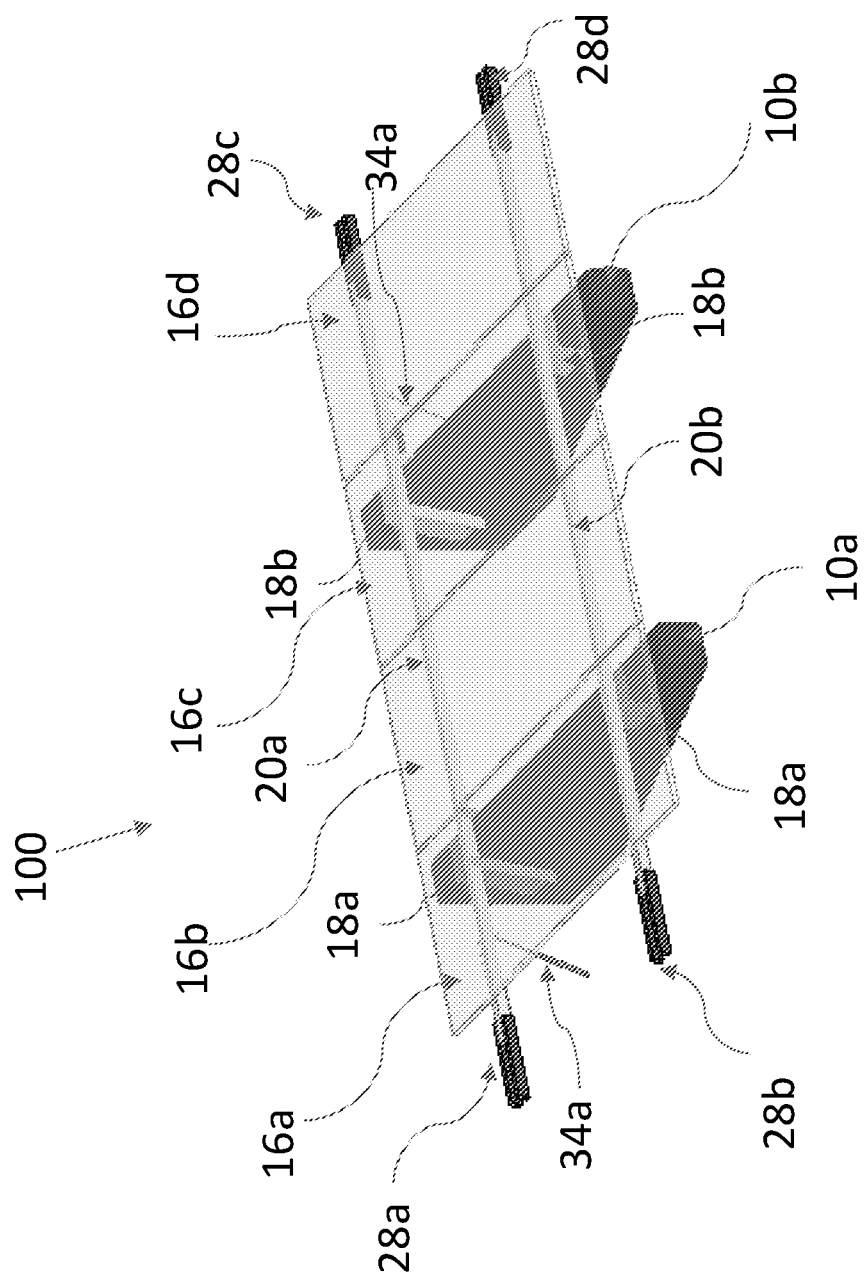

FIG. 6 shows a single modular unit of the invention in cutaway view.

Figure 7:
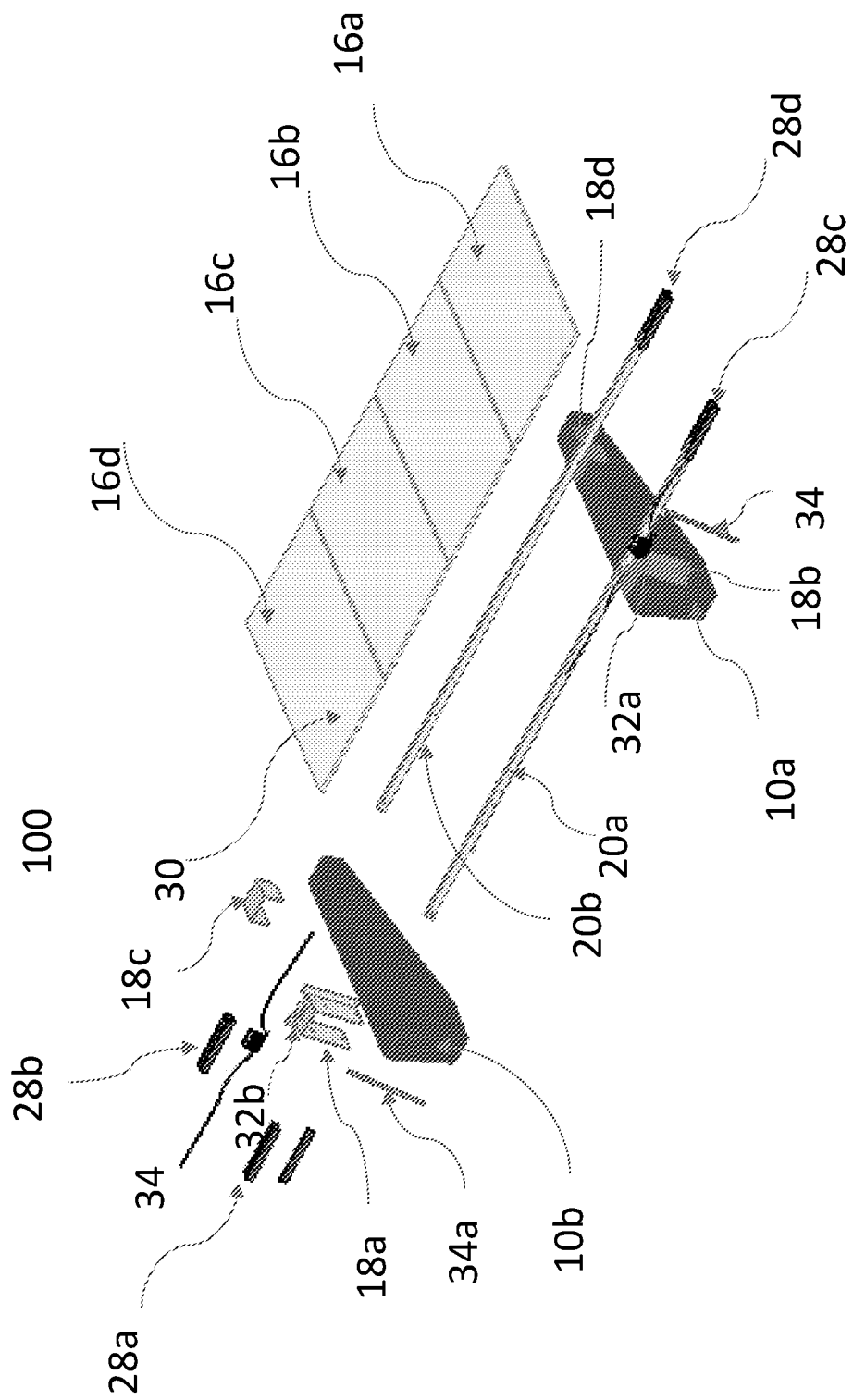

FIG. 7 is an exploded view of modular unit.

FIG. 8A-8D show modular unit 100 in various views.

Figure 8:
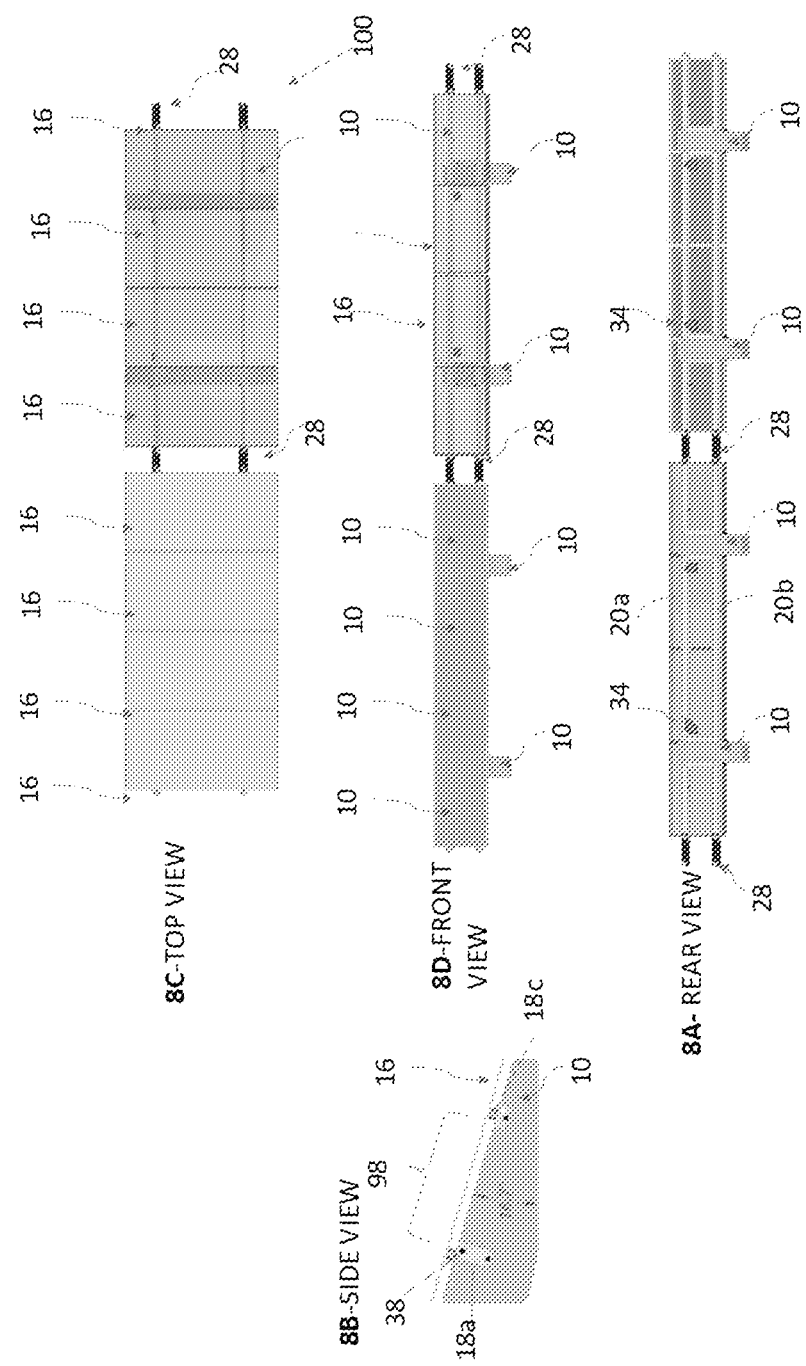
Figure 8E:
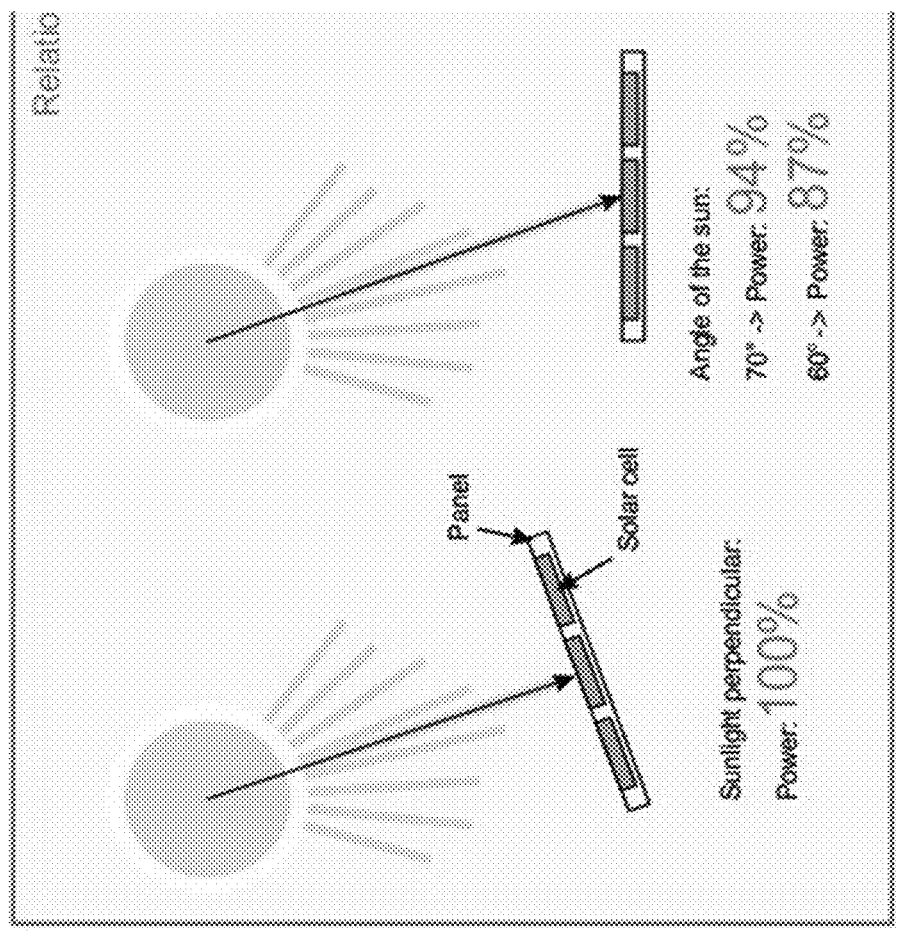

FIG. 8E shows the effect on solar efficiency, of the angle of the panels.

Figure 9:
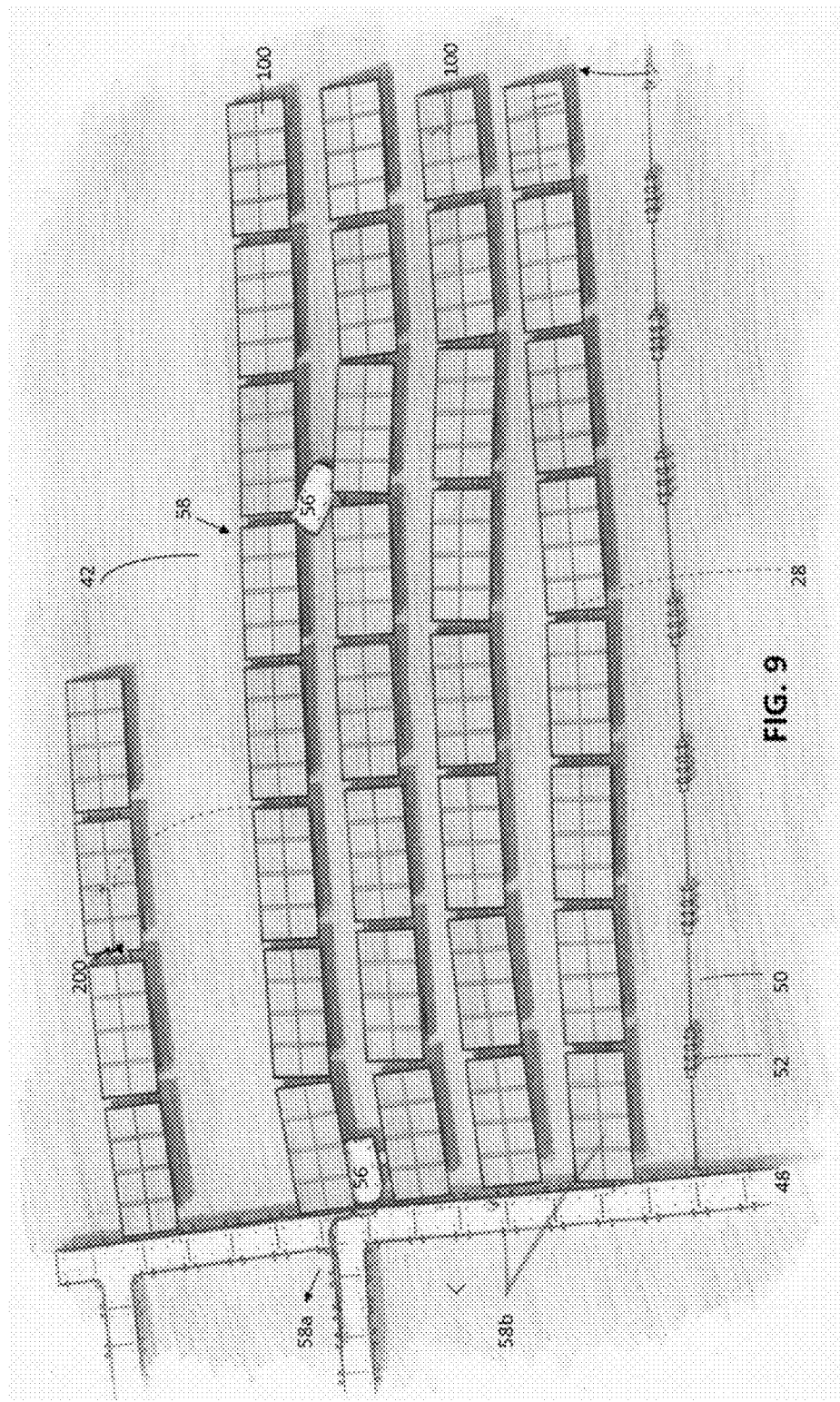

FIG. 9 is an aerial view of a plurality of modular units 100 after deployment upon a freshwater pond.

Figure 10:
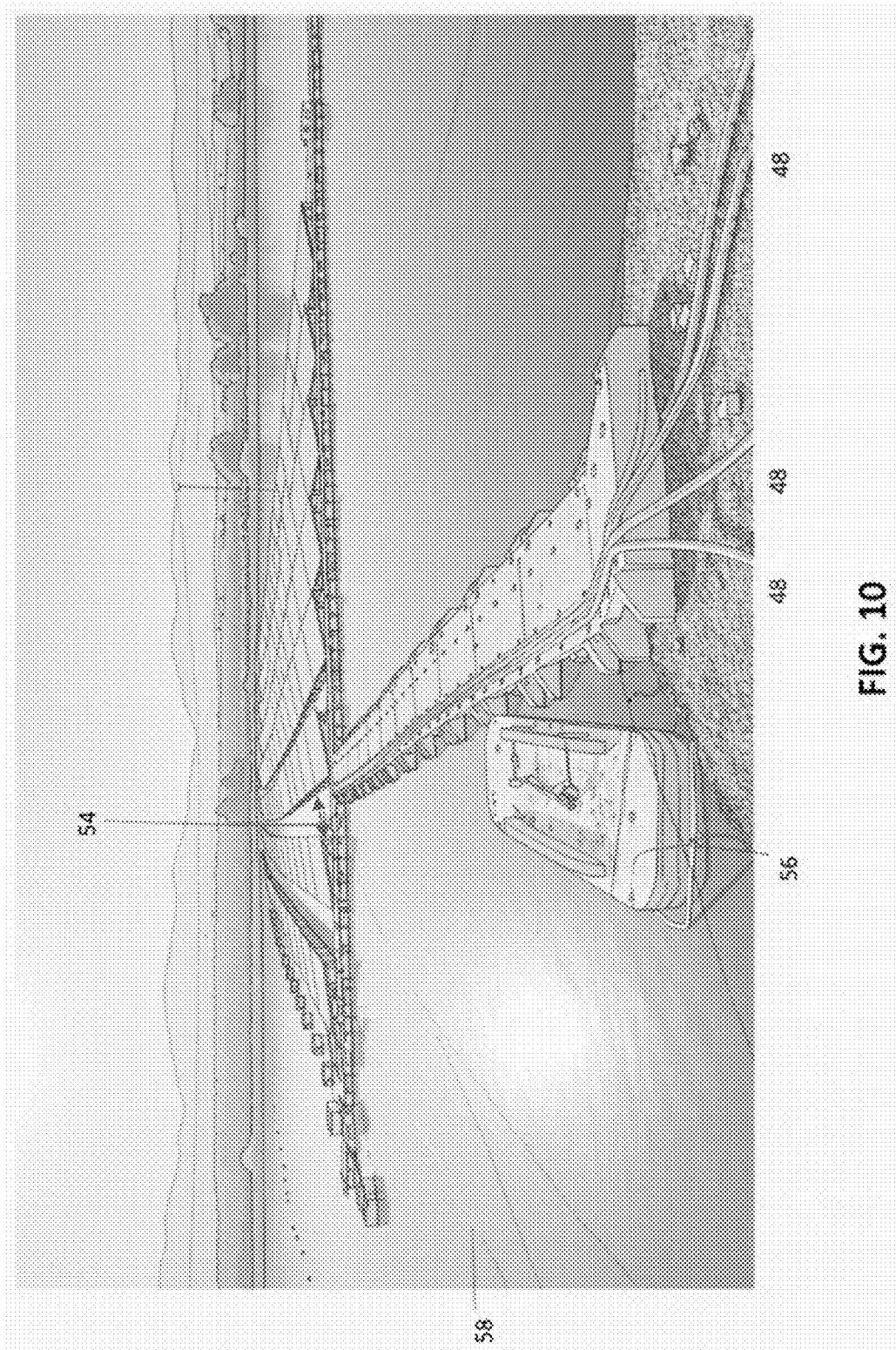

FIG. 10 shows floating platform in closeup perspective view.

Figure 11:
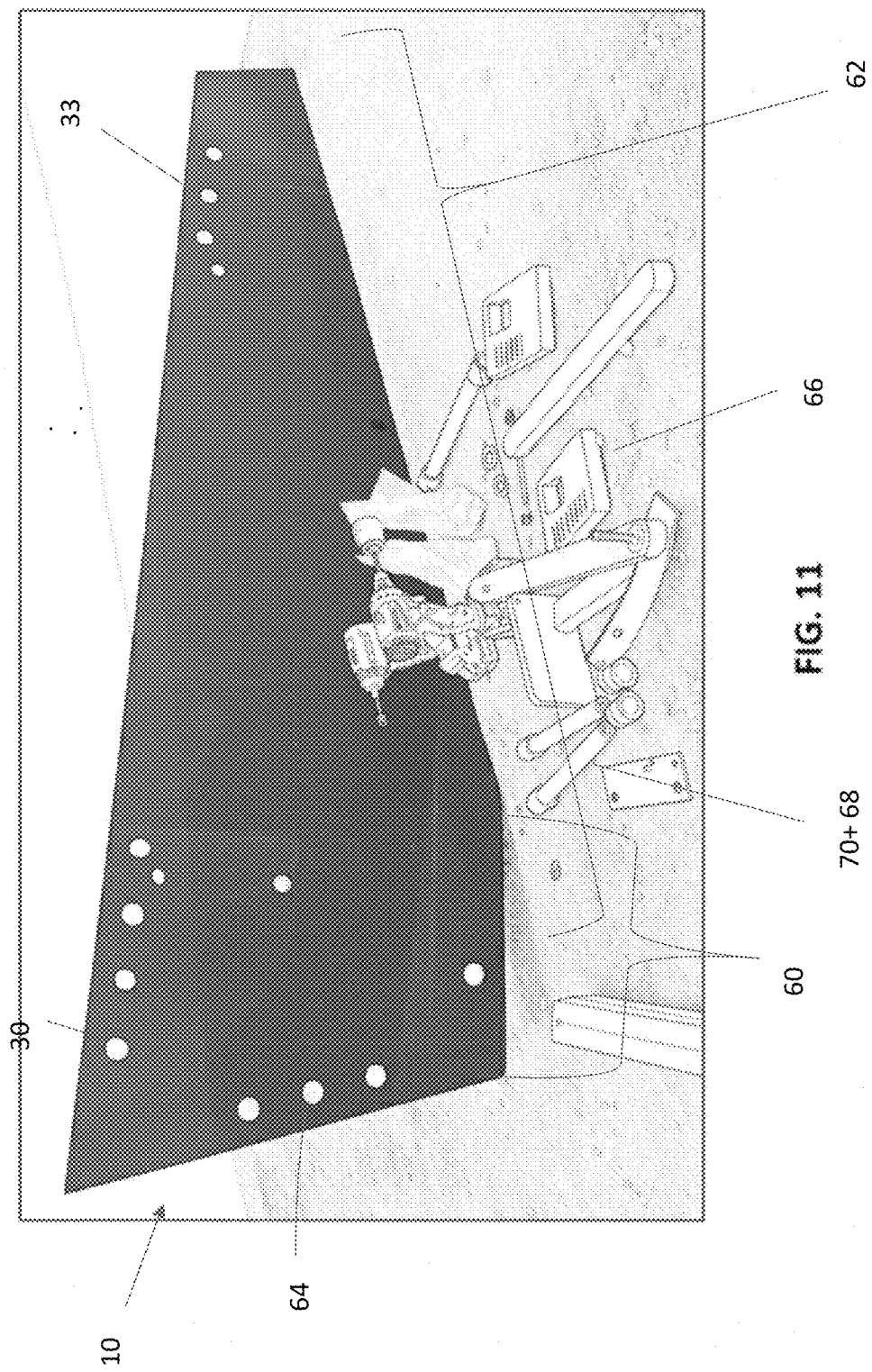

FIG. 11 shows float in closeup sideview.

Figure 12:
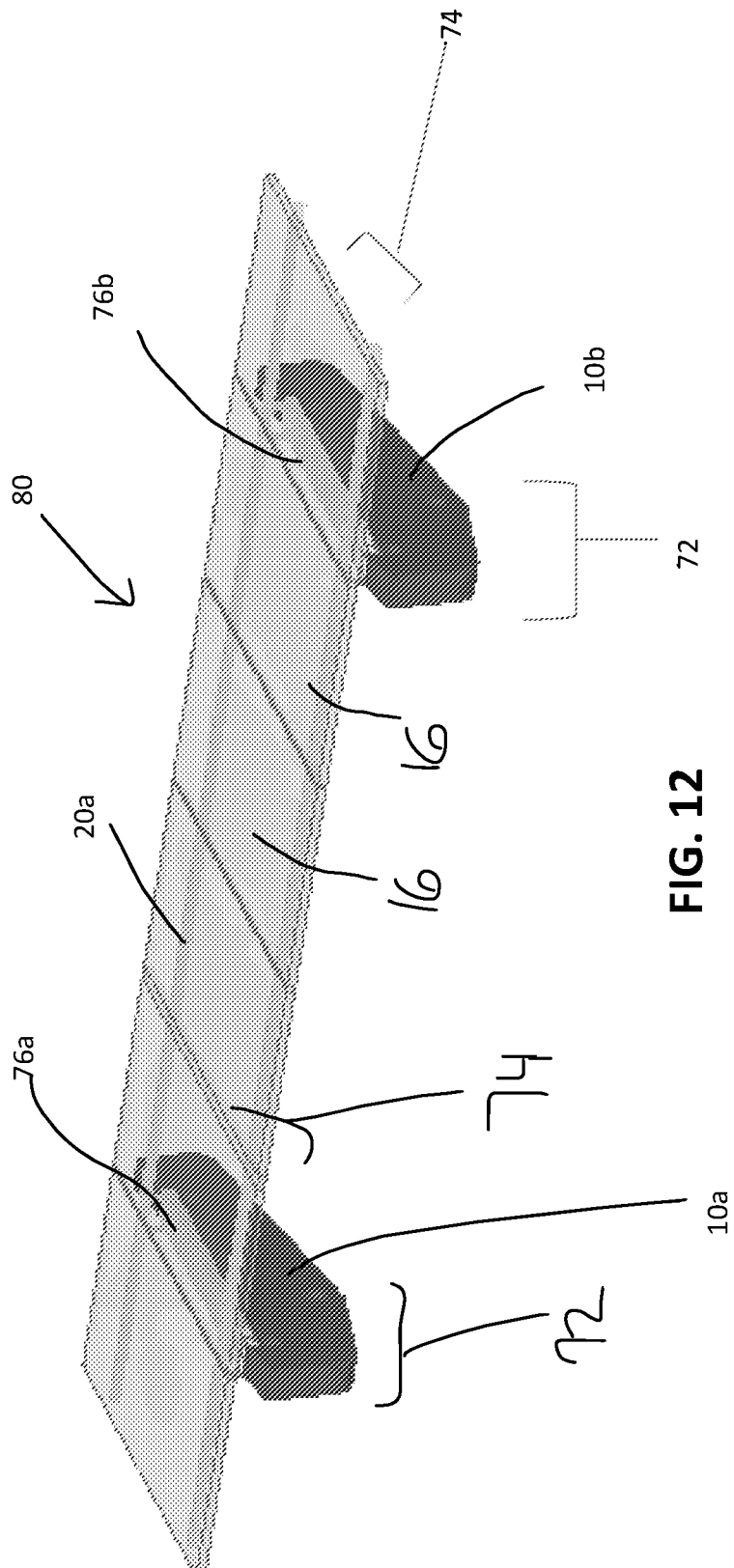

FIG. 12 illustrates another embodiment of the modular unit, having a pair of alternatively shaped floats.

Figure 13:
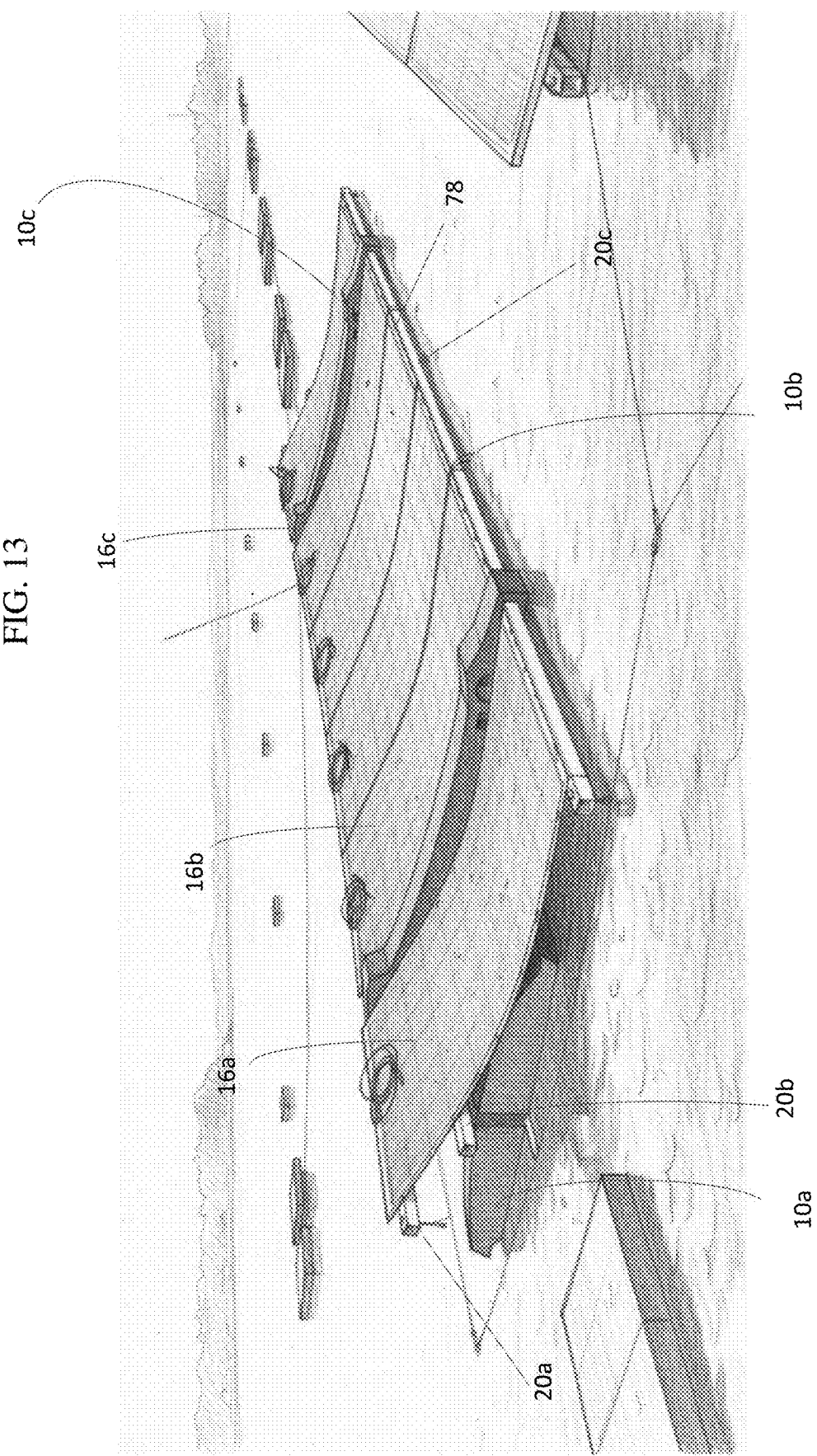
Figure 14:
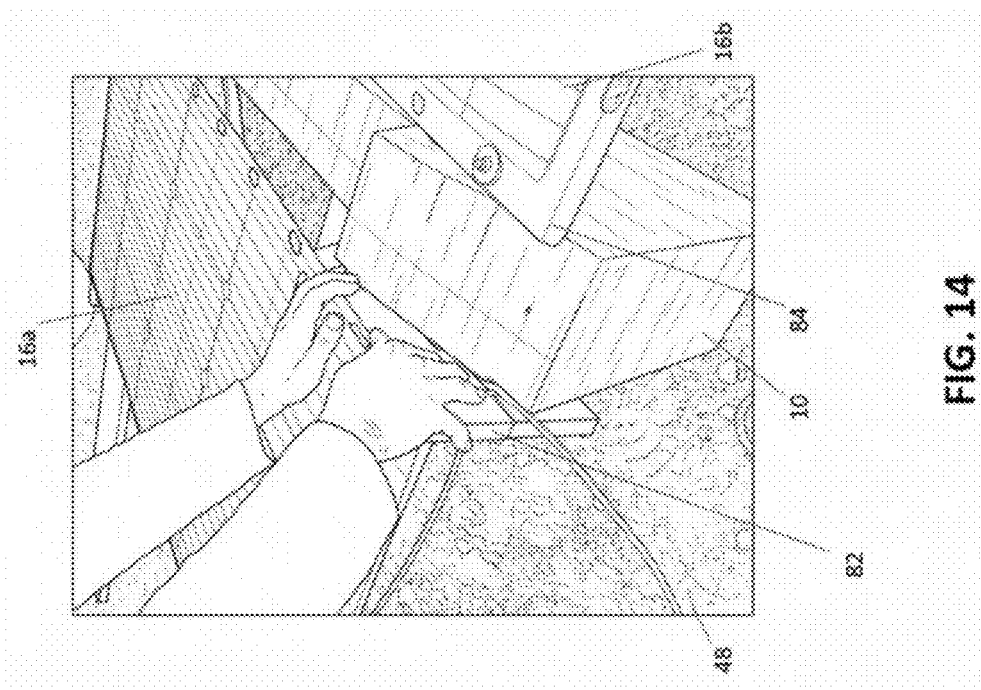

FIG. 13-14 show flexible solar panels instead of standard solar panels.

Figure 15:
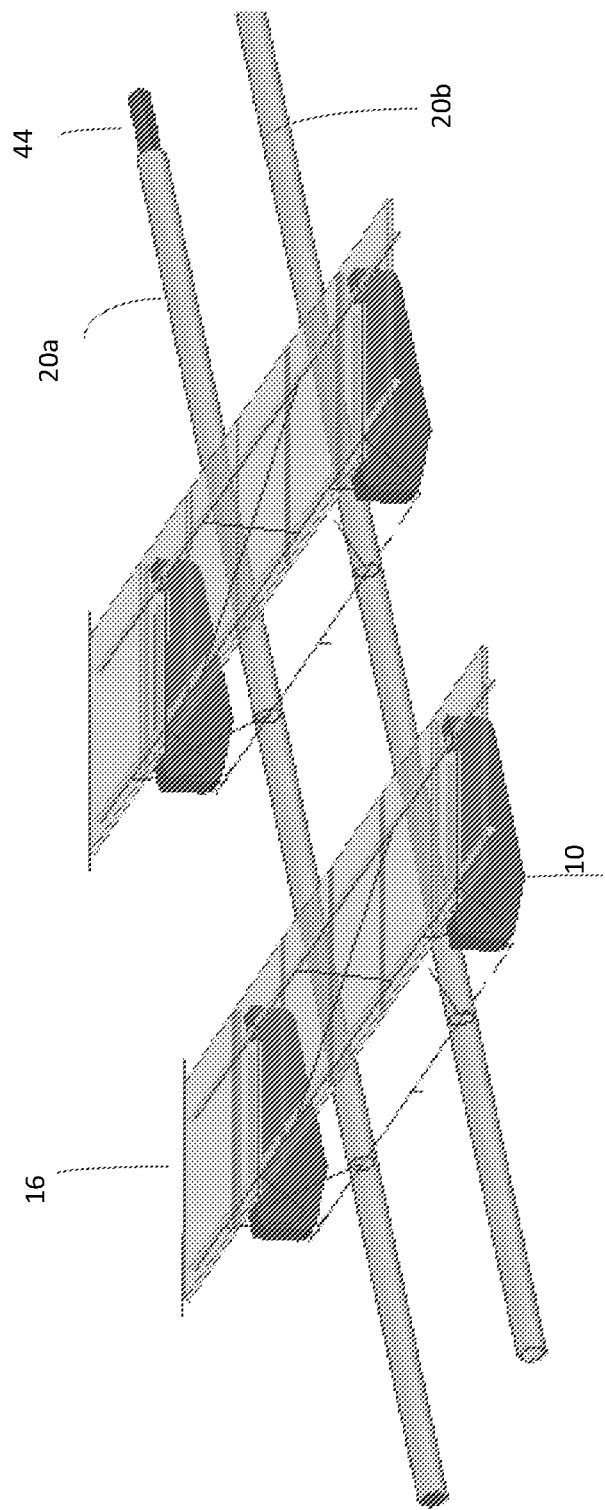

FIG. 15-17 shows alternative support bars formed of alternative materials: fiberglass (GRP), wood, and HDPE.

Figure 19:
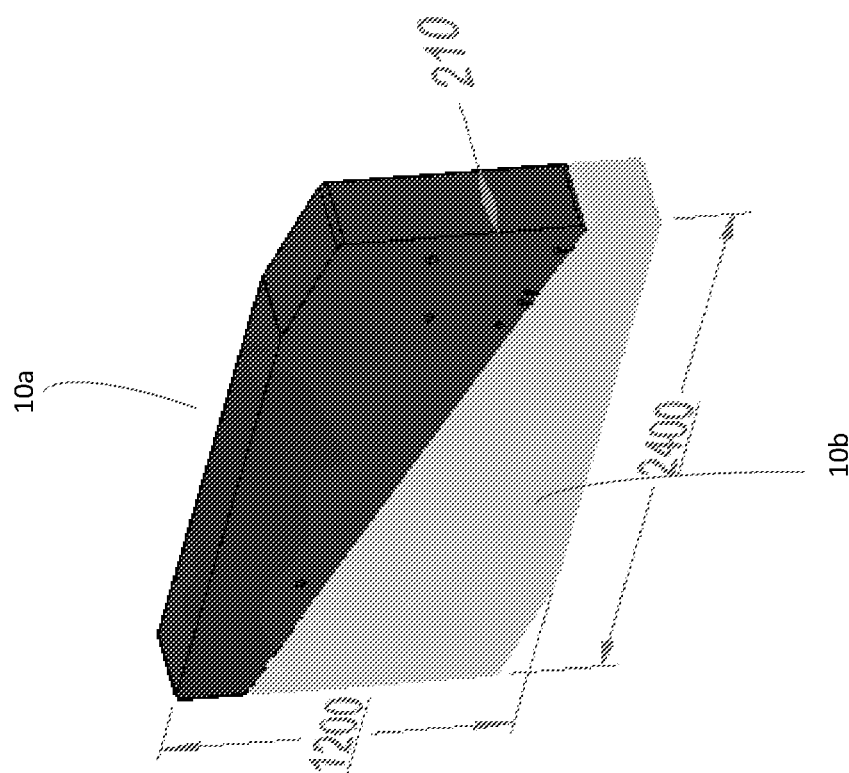

FIG. 19 shows various shapes and dimensions of floats formed of XLPE.

Figure 20:
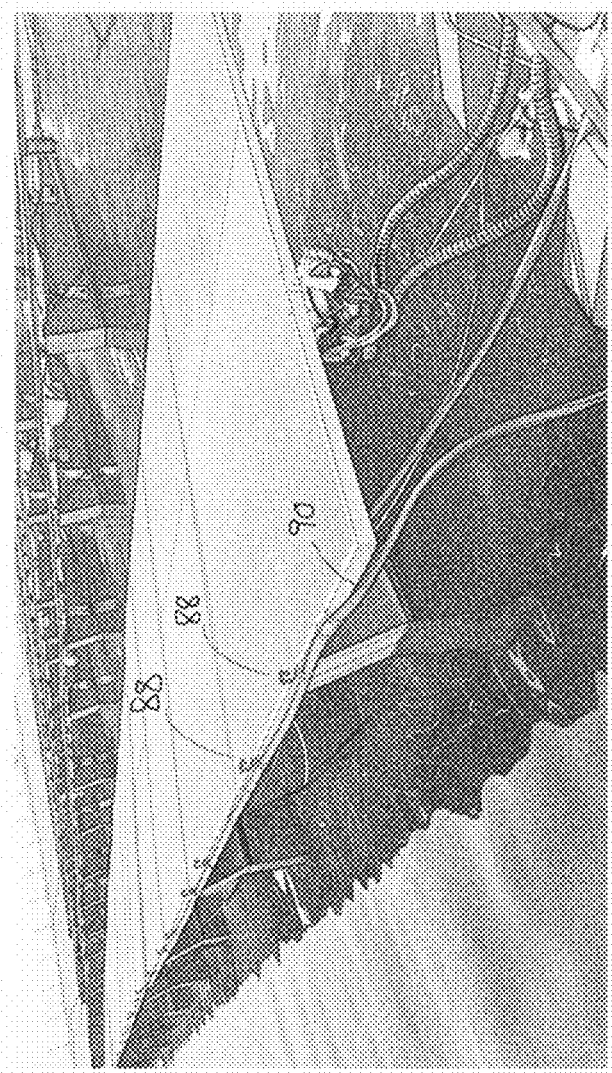

FIG. 20 shows inclusion of a sprinkler system.

Figure 21:
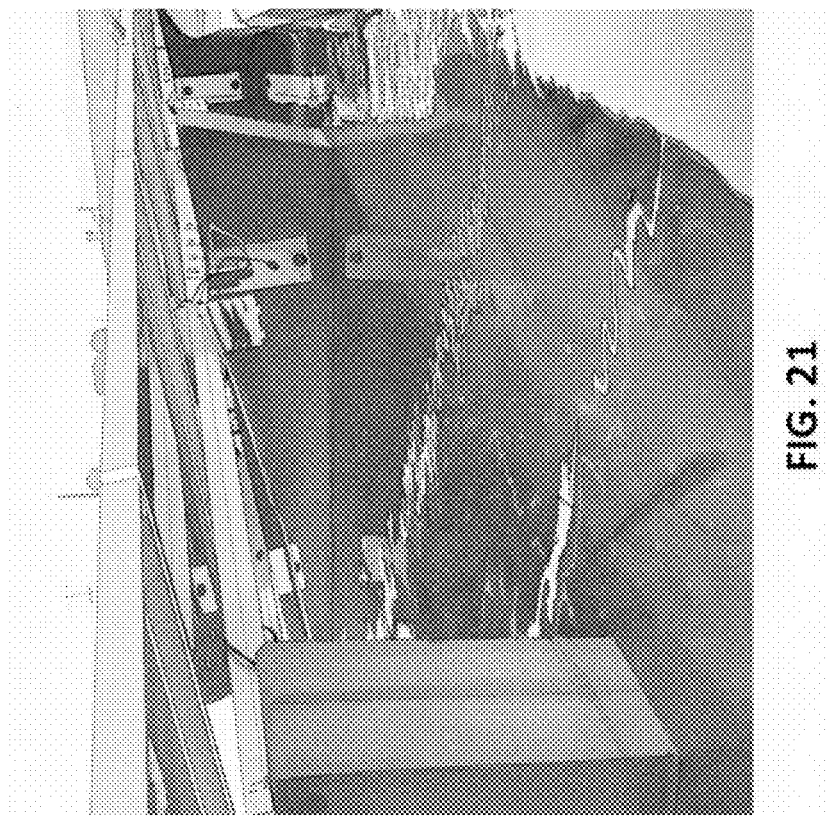
Figure 22:
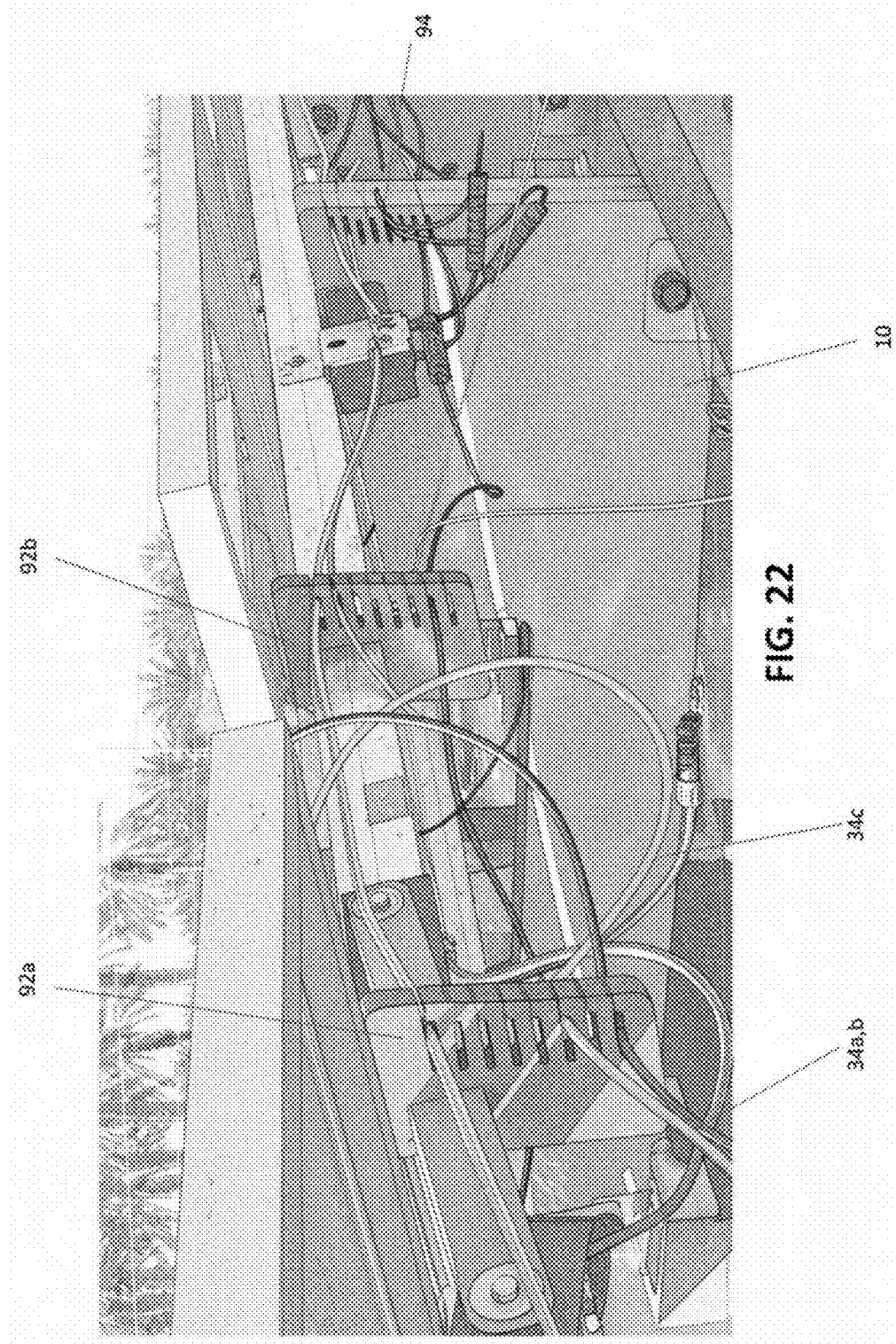
Figure 23:
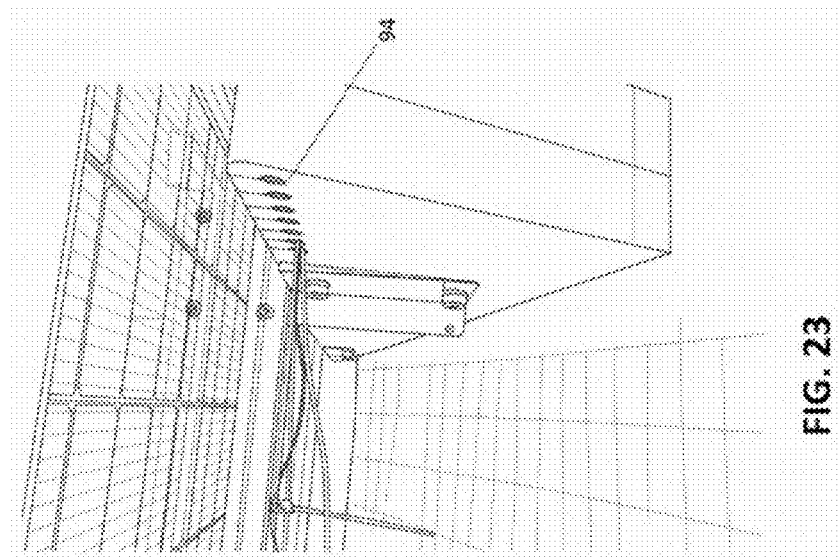
Figure 24:
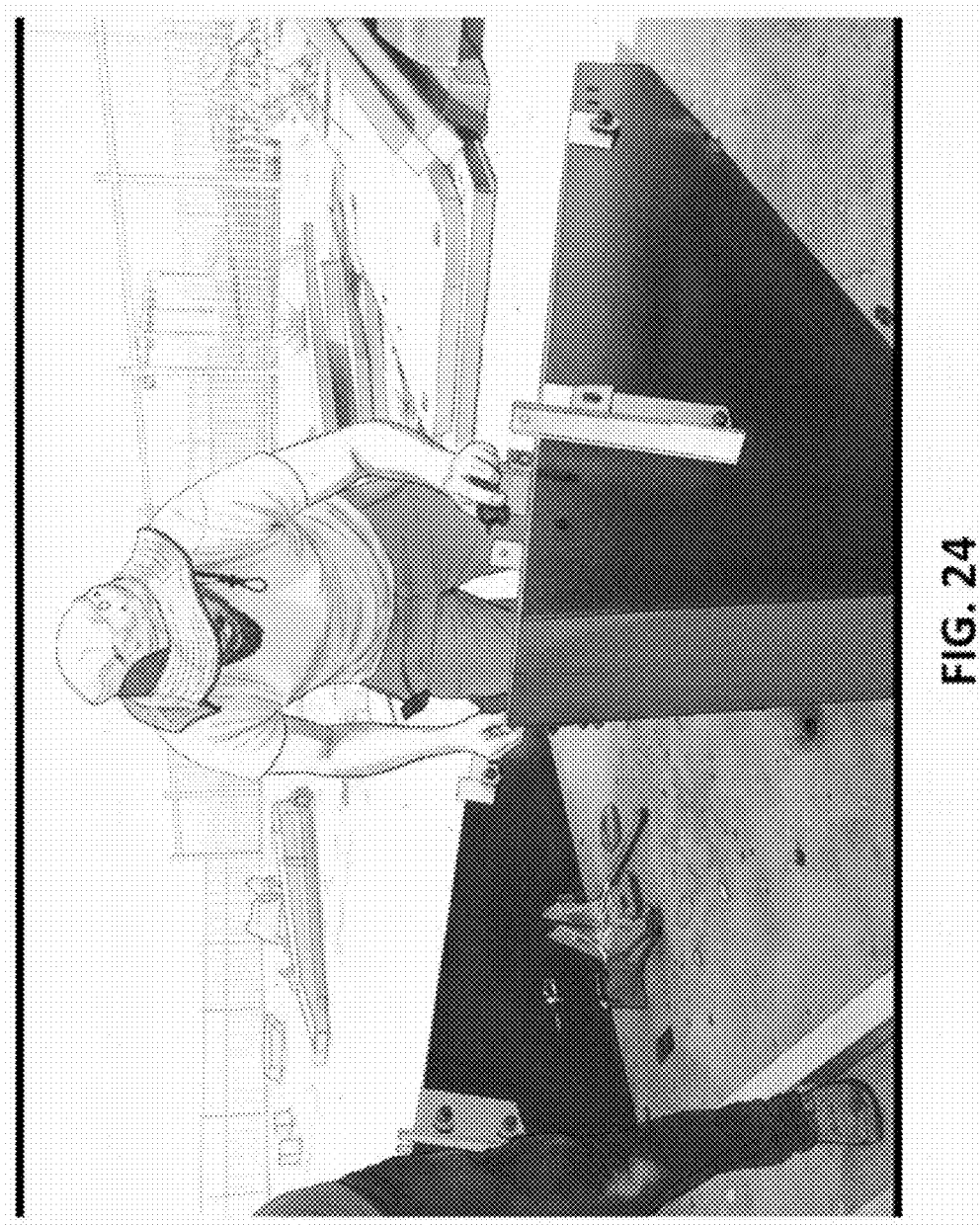
Figure 25:
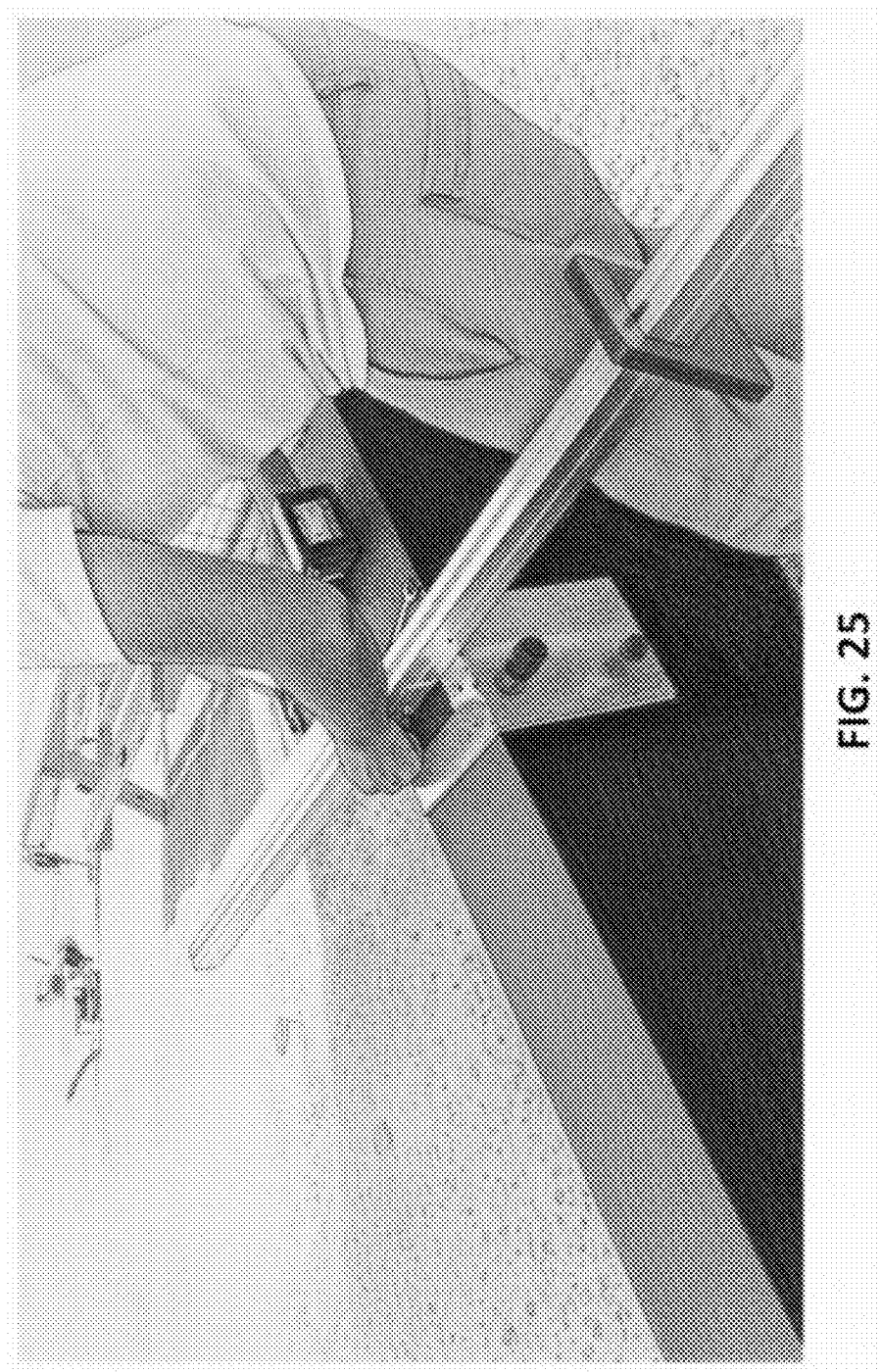
Figure 26:
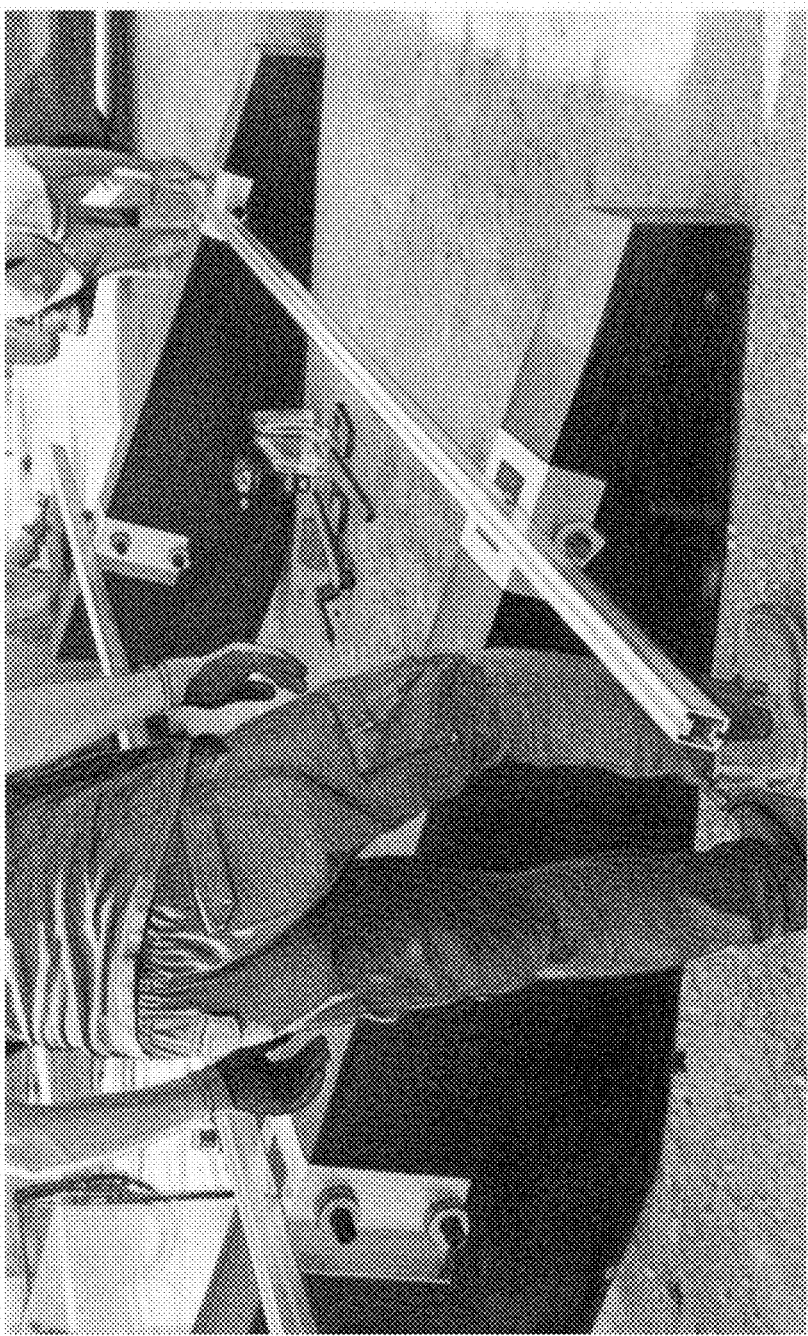
Figure 27:
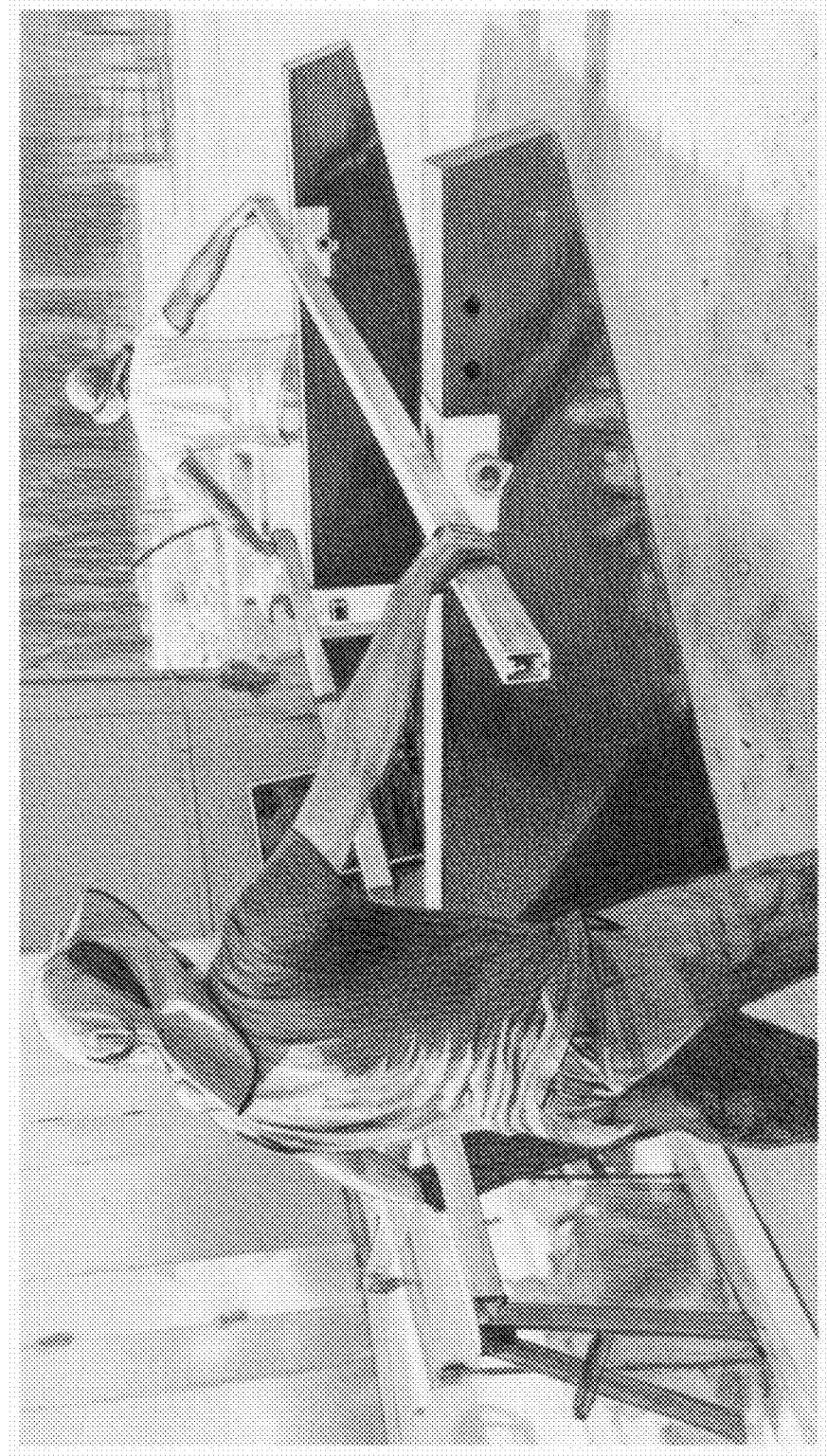

FIGS. 21-23, underside of panels and floats are shown in perspective view and closeup views.

FIG. 24-28 shows onsite construction of modular units and their deployment as a platform upon a freshwater lake.

Figure 29:
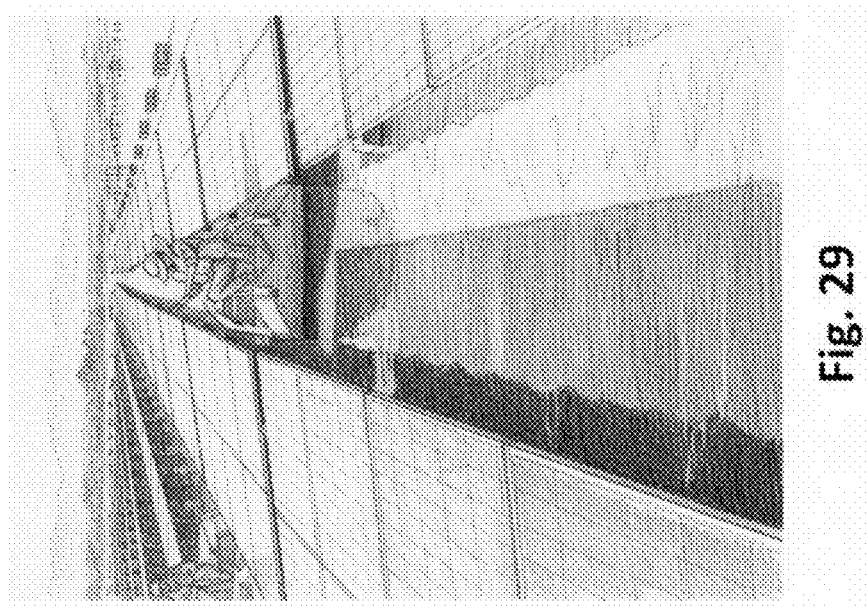
Figure 30:
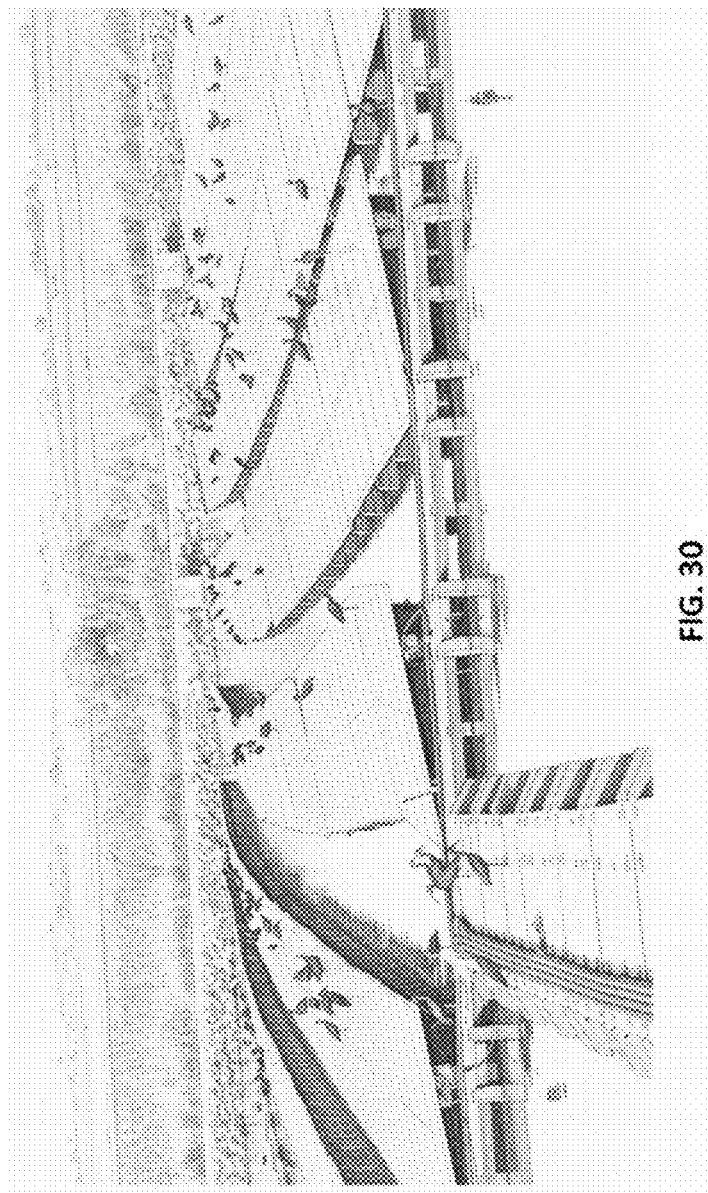

FIG. 29 shows periodic servicing of the platform.

FIGS. 30-33 illustrate the platform of the invention from various views.

Figure 34:
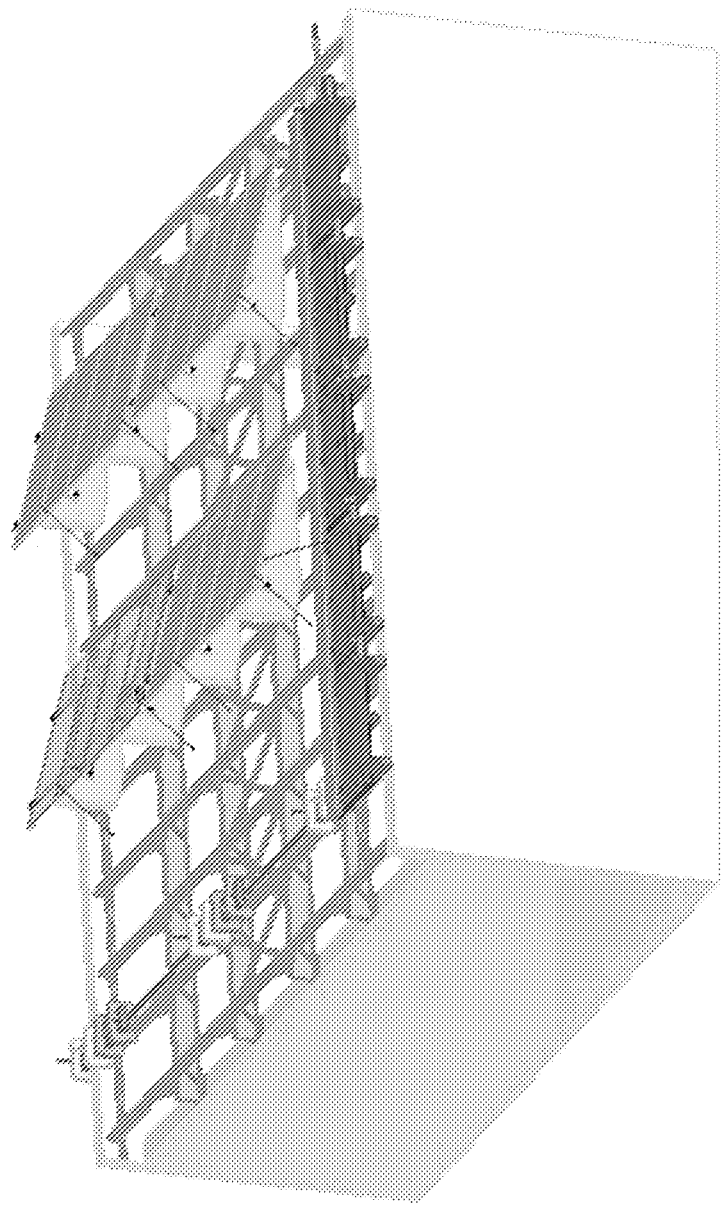

FIG. 34 shows deployment on a rooftop.

FIG. 35 shows an alternative two-part float, using HDPE as the float material.

Figure 36:
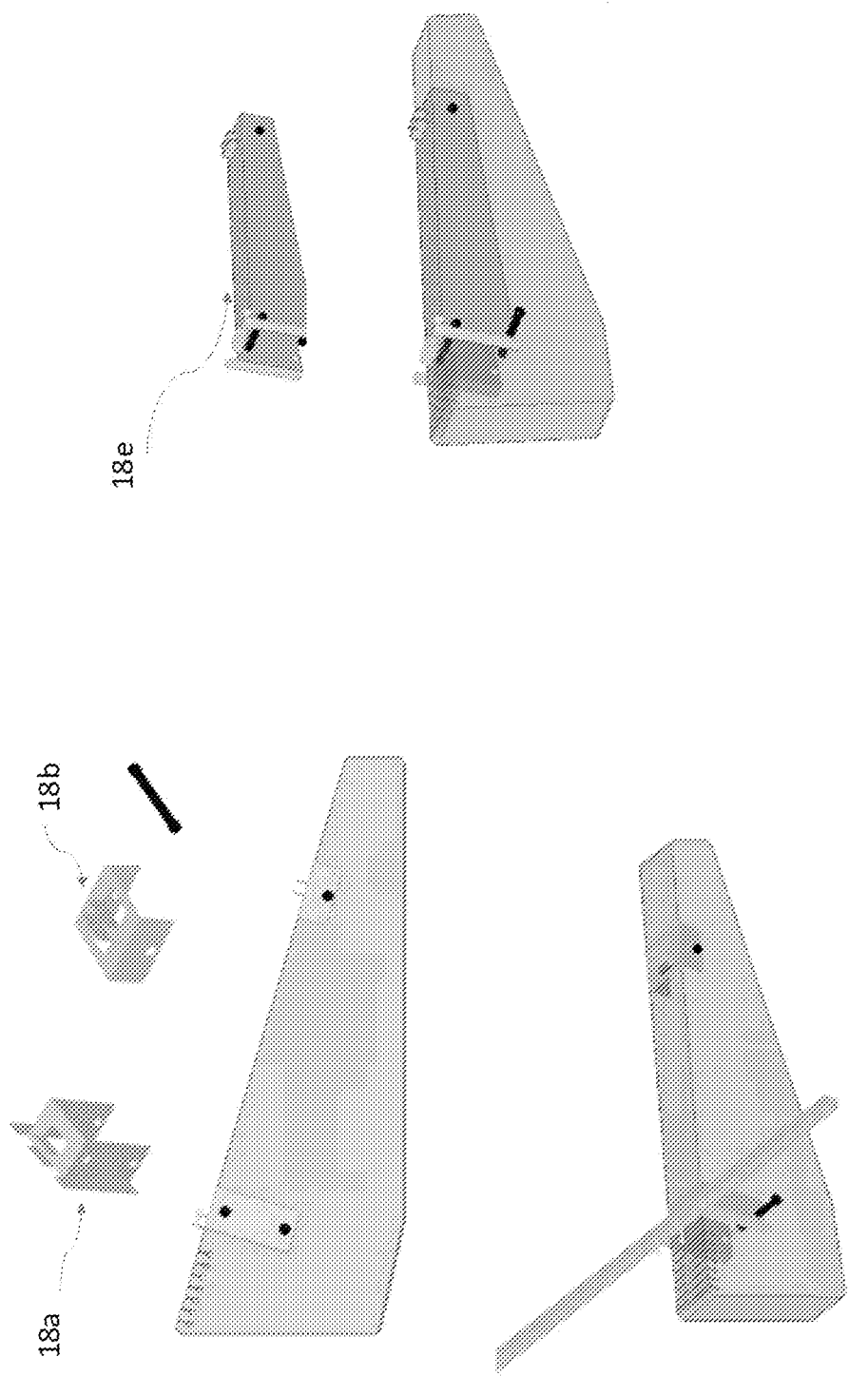

FIG. 36 shows an alternative lengthened U-clamp.

Figure 37:
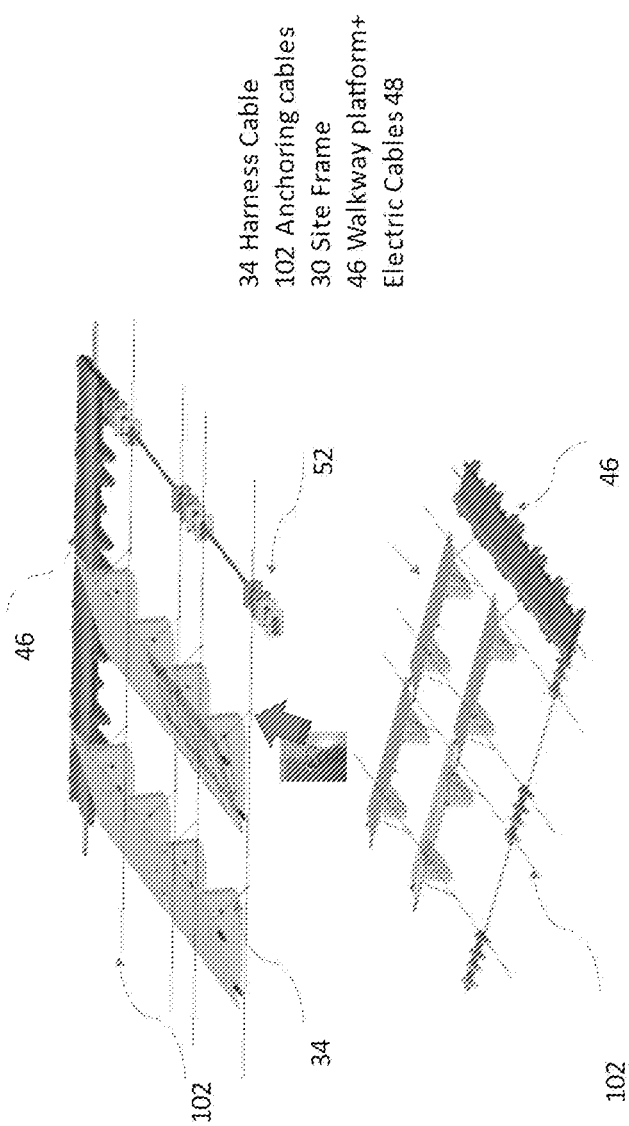

FIG. 37 shows mooring lines.

FIG. 38 shows flat plate force coefficient.

Figure 39:
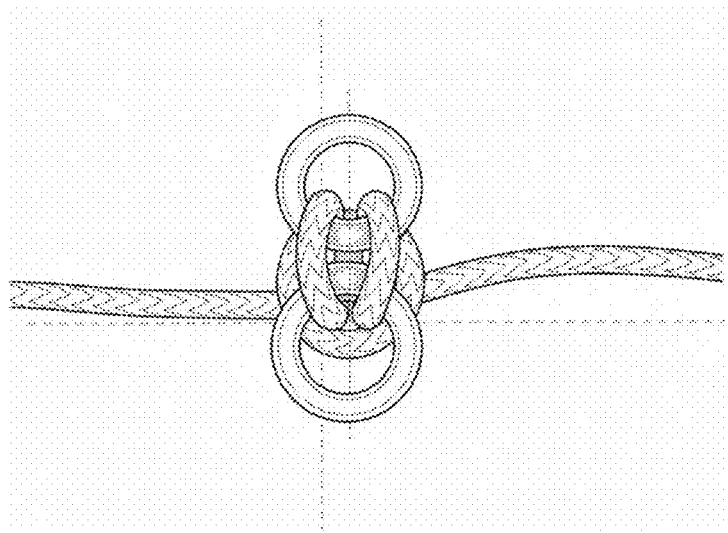

FIG. 39 shows the harnessing connector tie to the 8 shaped ring.

FIG. 40A illustrates a sideview of a single modular unit 100, and the acting loads and constraints causing rocking moments when strong north winds act on the unit (if positioned in the northern hemisphere).

FIG. 40B illustrates the modular unit of the invention rocking to steady state lower inclination, in response to North wind force.

FIG. 40C illustrates a sideview of a single modular unit 100, and the acting loads and constraints causing rocking moments when strong South wind act on the unit (if positioned in northern hemisphere) acts on the unit.

FIG. 40D illustrates the modular unit of the invention rocking to steady state lower inclination in response to South wind force.

FIG. 41 shows mounting of a parallel float between a pair of floats.

Figure 42:
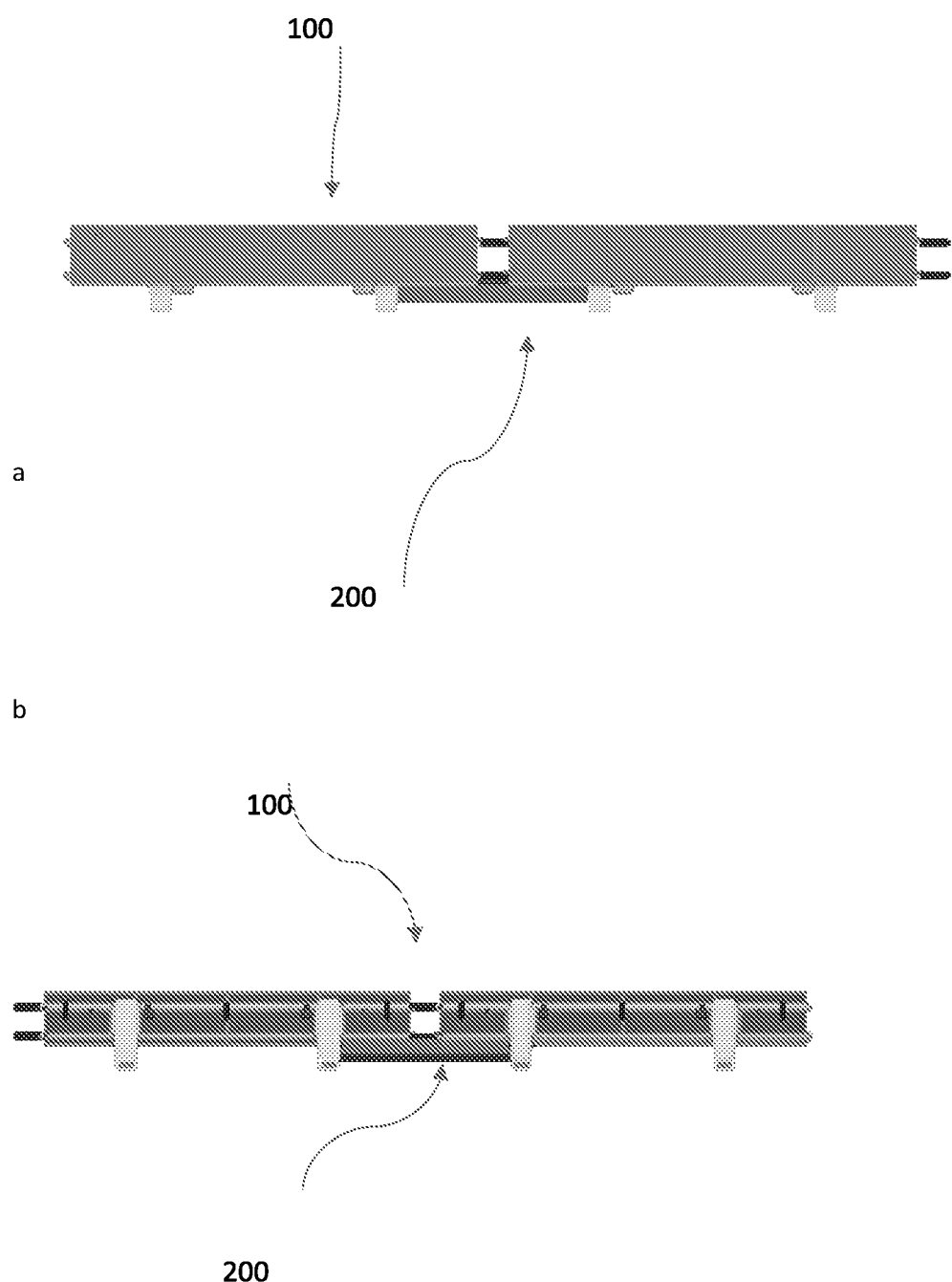

FIG. 42 shows mounting of a parallel float between two modular units.

DETAILED DESCRIPTION OF THE INVENTION

In the following detailed description, numerous specific details are set forth in order to provide a thorough understanding of the present invention. There is no intention to limit the invention to the details of construction and the arrangement of the components set forth in the following description or illustrated in the drawings. The invention is capable of other embodiments or of being practiced or carried out in various ways. Also, it is to be understood that the phraseology and terminology employed herein are for the purpose of description and should not be regarded as limiting.

In a general overview of the advantages of the invention, the present invention provides a modular floating platform for photovoltaic solar arrays, for deployment upon a body of water. The platform utilizes floats of a novel shape and material, and unique harnessing to anchoring cables, which grant the float longevity and maximal stability in wind forces, waves and water current. The float shape provides improved solar efficiency, as the angle of the panel is raised at a relatively acute angle from the horizon, allowing the panels to absorb more sunlight in comparison to previously known systems, which are typically angled at a lower angle relative to the horizon in order to lower their wind resistance.

Figure 4:
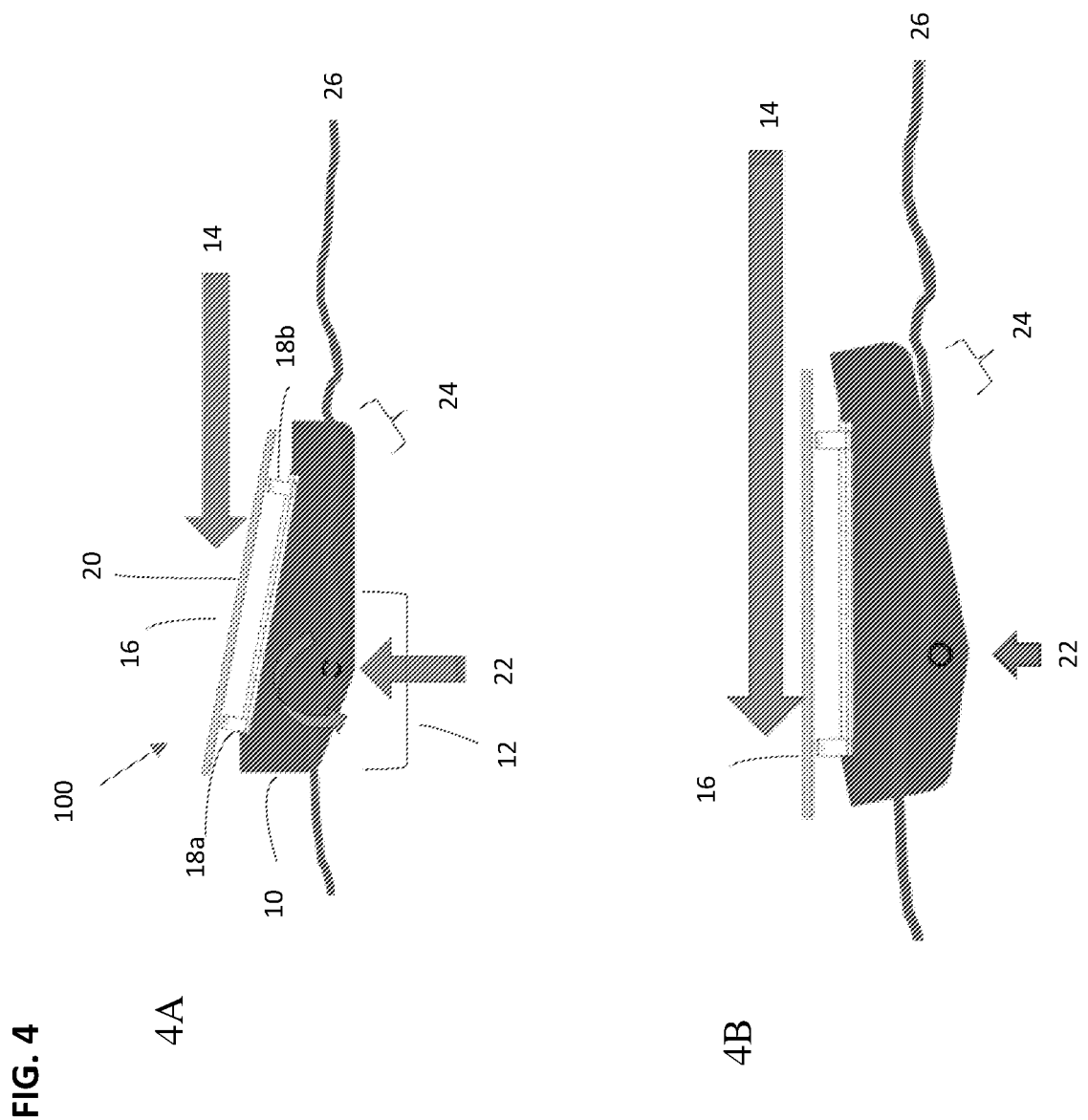

Referring to FIG. 4A, a sideview is shown of a single modular unit 100, that forms the floating platform of the invention. Modular unit 100 illustrates solar photovoltaic panel array 16, held by metal U-clamps 18a, 18b and aluminum support bar 20, which secure the panel at a slant upon a pair of floats 10 (a single float appears in FIG. 4).

Float 10 has an angled underside 12 shaped similarly to a hard chine hull of a boat, allowing the float 10 to rock (rotating arrow) upon the water 26, in response to waves or wind force. In the modular unit of the invention, the pair of essentially triangular floats act as catamaran dual hulls to provide improved buoyancy to the platform.

Arrow 22 indicates point of buoyancy, which is located off-center relative to the center of the solar panel array 16, due to the float's angled underside hard chine hull.

Arrow 14 indicates the direction of a south wind force if the solar panels are placed in the northern hemisphere.

Referring to FIG. 4B, significant wind force indicated by Arrow 14, has forced panel array 16 to a position parallel to the horizon, with float 10 rocked upon its point of buoyancy 22, so that the rear 24 of the float has temporarily risen out the water 26.

In comparison, referring back to FIG. 4A, the rear end 24 of the float 10 was submerged.

Thus, the angled underside of the float 10 provides improved buoyancy and reduced friction on the structure, not previously shown in the art, allowing the modular units to rock individually upon the water without being lifted and flipped by wind or waves, without being pulled from mooring, and without impacting upon adjacent arrays.

The underside of the float may have various angled walls that accomplish improved buoyancy and wind resistance, to resemble the hull of a boat, including, but not limited to: round-bottom hulls; V-bottom hulls (shallow V or deep V); hard-chine hulls; two central underside walls at obtuse angles relative to one another (float generally appearing as an obtuse-angled triangle); and highest wall of a generally triangular float including a cut-off underside at its lowest point (area 60 in FIG. 11).

In a presently preferred embodiment, float 10 is made of a closed cell cross-linked polyethylene foam, such as XLPE.

This material has not been suggested in past for use as floats for solar panel arrays as it is considered incapable of supporting the panel arrays; rather prior art typically utilizes blow-molded HDPE, injection molded plastics or HDPE extruded high pressure tubing.

The inventor has overcome the lack of rigidity of XLPE foam, and has lowered material costs, by using medium density XLPE foam, and by including aluminum support bars 20 and U-clamps 18 at weight-bearing locations upon the float, to act as a panel support frame. Additionally, careful selection of the material specifics of the selected closed cell cross-linked polyethylene foam allows its use to bear weight of the panels.

The inventor has discovered that floats of closed cell polyethylene foam, have lower degradation over time and lower depolymerization, in response to the UV light of prolonged sun exposure found in solar energy applications. This material was shown by the inventor to be resistant to the corrosive effect of seawater. Additionally, since the material includes numerous closed cells, puncture of one area of the float by debris, by grounding or by dragging over rough surfaces, will not result in sinkage, as the remaining cells will continue to float. The floats of the invention are not harmed when serviceman walk upon the platform, in comparison to the prior art floats formed of blow molded HDPE or plastic mold injection, which are fragile in comparison.

Referring to FIG. 5, an example of float material is "PA45 Palfoam", which is a cross-linked, closed cell polyethylene foam also known as XLPE, manufactured using plate-compressing technology, by Palziv of Kibbutz Ein Hanatziv, Israel. The technical specifications of this PE foam are found in FIG. 5.

The cross-linked nature of the closed cell polyethylene foam forms branched links from the straight carbon chain, thus creating a more durable and stable structure.

Optionally, fire retardant and additives may be added to the foam.

In some embodiments, an external stiffer laminate is included over the soft foam float.

Referring now to FIG. 6, a single modular unit 100 of the invention is shown in cutaway view. Solar photovoltaic panel arrays 16a, 16b 16c, 16d, are supported upon a pair of aluminum support bar 20a, 20b, which are held to floats 10a, 10b by metal U-clamps 18a, 18b, 19a, 19b.

U-clamps 18 and 19 are secured to the surface of the floats by lengthened pins that enter drillholes in the foam float.

In certain embodiments, (shown in FIGS. 15-17), support bars 20a, 20b may be formed of fiberglass (GRP) or wood, which may lower the cost of production and due to their lower conductivity, may remove the regulatory need for electrical grounding of the platform.

Bumpers 28a, 28b, 28c, 28d, made of flexible shock-absorbing material, are placed upon the ends of support bars 20a, 20b, to allow free independent movement, in any direction, of each modular unit upon the water, in response to wind or waves. Bumpers additionally absorb impact from adjacent solar panels, that may occur during windy or stormy weather. A presently preferred material for bumpers 28 is Panello, (a three layered material made by Palziv of Kibbutz Ein Hanatziv, Israel, having outer layers of plastic 1-1.5 mm thickness and an inner layer of closed cell cross-linked PE foam of at least 10 mm thickness). Other materials may be HDPE sandwich, or UHMW.

Solar photovoltaic panel arrays may be bifacial panels, to absorb maximal sunlight from both above and beneath the panel. An example of a panel is a Bifacial Perc P-type Si panel manufactured by Jinko Solar Ltd. of Haining, China.

In an alternative embodiment enlarged upon below, solar panels may be portable flexible panels for rapid deployment, such as Sunpower 110 Watt flexible solar panel, catalog number SPE-E-FLEx-110, manufactured by Maxeon Ltd./Sunpower Ltd.

Referring to FIG. 7, an exploded view is shown of modular unit 100. Drillholes 30 are apparent upon float 10, and accept lengthened pins that connect U-clamps 18a, 18b to floats.

Upper angled side 98 of float 10 is shown. Solar panel 16 will slant downwards relative to the horizon, with the angle of the panels depending upon the angle of the float upper angled side 98.

Large U-clamps 18a, 18b include protruding upper slots 32a, 32b, 32c, for accepting tie down ropes 34 that harnesses the support bars and the anchoring cables to anchor the platform to shore and to the lakebed.

In FIG. 7, four solar panels are floated upon a single pair of floats 10, however the number of panels per pair of floats may vary, depending on the size and weight and of the solar panels, and depending on whether panels are rigid or flexible panels. In one embodiment, 1-8 panels per pair of floats are used.

Referring to FIG. 8, modular unit 100 is shown in various views.

In FIG. 8A, a rearview is shown, in which tie down ropes 34 are shown that attach to harnesses and act to tie the invention to anchors placed upon the shore and at the bottom of the lakebed.

Referring to FIG. 8B, a sideview of the modular unit 100 is shown. Large U-Clamp 18a, and U-clamp 18c attach to spacers 38 to hold panel 16 upon float 10 at a slant relative to the horizon As shown especially in FIG. 8B (Side view), the angle of the panels relative to the horizon is shown as being 16.7°, a relatively acute angle. This angle is based on the angle of the angled upper side 98 of the float 10.

It is notable that the angle of panels relative to the horizon may be 12-36°, which grants the panels highly improved energy efficiency, compared to prior art systems in which the angle is typically 5° relative to the horizon. Improved efficiency is especially important in non-equatorial countries that receive less sunlight.

Without being bound by theory, the improved buoyancy of the floats allows the panels to be set at the relatively acute angle 12-40°, without fear of the panels tipping or becoming airborne. The hull-shaped underside of the float is one factor contributing to the improved buoyancy. The angle of the panels depends on the angle of the angled upper side 98 of the panels, compared to the horizon; when the modular unit is deployed on water, the angle of the panels may vary depending on the center of mass of the modular unit, relative to the central point of buoyancy (as discussed in relation to FIG. 4).

The relatively acute angle of the panels, found in the present invention, allows significantly more sunlight to reach the panels. The angle of 12-36° allows access to sunlight for most of the day (maximal direct sunlight is at noon).

FIG. 8E shows the effect on solar efficiency, of the angle of the panels, relative to the horizon.

In some instances, the panels may be at an angle of 5-40°.

Referring to FIG. 8C, modular unit 100 is shown in aerial view. Cables 36a, 36b present above the panels, connect panels to U-clamps 18 and ensure security of panels in high winds. The modular unit is thus harnessed to a flexible towing point.

Referring to FIG. 9, an aerial view is shown of a plurality of modular units 100 after deployment upon a freshwater pond 42, as a single loosely connected floating platform 200 generating solar energy.

Modular units are loosely connected to one another by bumpers 28. Loose connection between modular units provides several advantages over the typical prior art practice of rigidly connecting multiple solar arrays: The loose connection allows modular units to move relative to one another, in response to wind or waves, with lessened chance of impact. Forces are absorbed by shock-absorbing material of the bumpers, to prevent harm to the panels. Spacing between adjacent arrays allows free flow of water, preventing algae buildup and insect proliferation in the pond. Should an electrical short occur in one area of panels, any resultant fire will be contained to a single modular unit and will not spread to the entire platform.

Floating platform 200, includes service walkway 46, typically placed on the east or west side, with solar arrays facing east. Service walkway 46 to allow personnel to walk upon it and reach various areas of the platform, has a light weight structure placed upon floats, such as Panello floats manufactured by Palziv of Kibbutz Ein Hanatziv, Israel.

Central electrical cables 48 carry electrical current from the platform 200 to shore for use.

Several mooring lines 58a, 58b, and fiberglass rod 50, are stretched around the periphery of the entire structure 200 and are weighted down to the bottom of the pond by sunken anchors (not shown). Mooring lines may alternatively be secured to posts installed on the banks of the pond. A series of drifting markers 52 indicate to the viewer whether mooring lines remain intact and taut.

Referring to FIG. 10, floating platform 200 is shown in closeup perspective view. The distance 54 between rows of modular units 100 is 1.6-1.2 meter to allow sufficient area for the floats 10 to rock upon the waves, without the panels impacting one into another.

FIG. 10 depicts the acute angle of the panels compared to the horizon, equivalent to approximately 12-18°. Such acute angle provides maximal exposure of the panels to sunlight, resulting in improved energy efficiency.

Raft 56 allows servicemen to reach all sides of the platform, including routine maintenance of the undersides of the panels.

Central electrical cables 48a-d carry electrical current from the panels to shore.

Referring to FIG. 11, float 10 is shown in closeup sideview. Underside of float resembles a V-bottom hull of a boat by including upward-angled area 60 at rear of float 10, which has a wide-angle compared to the remaining underside area 62. Upward-angled area 62 grants the float the boat-like ability to rock upon the waves, and an offset point of buoyancy.

Drill-holes 30 and 33 accept pins that connect larger U-clamp 18a and smaller U-claim 18c to float 10. Drillholes 64 accept electrical cords (not shown) necessary for carrying electrical current from the panels to the shore.

Various spacers 66, 68, and small connecting rods 70 are used to connect between modular units and between the elements of the modular unit. Spacers may be made of any desired light-weight material, such as HDPE, chipboard or recycled material, wood or aluminum.

Referring to FIG. 12, another embodiment of the modular unit 100 is shown, having a pair of alternatively shaped floats 10a, b. Floats 10a,b, have undersides reminiscent of a round-shaped hull, due to angled and rounded areas 72, 74 at front and rear of floats 10a,b.

Solar array 80 includes 6 solar panels 16 per two floats 10a,b.

Cross-beams 76a, 76b replace U-clamps, and act to secure solar array 80 to support bars 20a,b. Cross beams 76a,b are fixed by lengthened pins to the upper surface of floats 10a, 10b via drill-holes (not shown).

Referring to FIG. 13, a floating solar platform 200 is shown, which utilizes flexible solar panels 16a,b,c instead of standard solar panels. As shown in FIG. 13, flexible panels are placed upon support bars, in a cambered arch, so that the aerodynamic forces prevent the panels from lifting up in strong wind. Flexible panels are lightweight and thus easy to transport and deploy.

Additionally, flexible panels may be more aerodynamic and provide more optimal properties relative to wind forces.

A unique set of floats is utilized, including a pair of shortened end-floats 10a (second end-float not shown). Lengthened support floats 10b, 10c are used, extending at least the length of the panels, and optionally jutting beyond the panel area.

Flexible panels are attached directly into support bars 20a,b,c via multiple drillholes 78 present on the edges of panels. Support bars 20a,b,c are connected to floats 10a,b,c as shown.

Referring to FIG. 14, a closeup is shown of flexible panels 16a, 16b being attached to float 10 and to support spacer 82. Flexible panel 16b is fixed upon side-shelf 84 of float 10. Electrical cord 48 is shown.

Referring to FIG. 15-17, support bars 20a, 20b are formed of fiberglass (GRP) or wood, which may lower the cost of production and due to their lower conductivity, may remove the regulatory need for electrical grounding of the platform.

Support bars 20a,b, are loosely connected to support bars of adjacent modular units (not shown) via shock-absorbing bumpers 44.

The number of support bars 20, and their orientation relative to the floats 10 and panels 16, may vary.

Figures 16A, 16B:
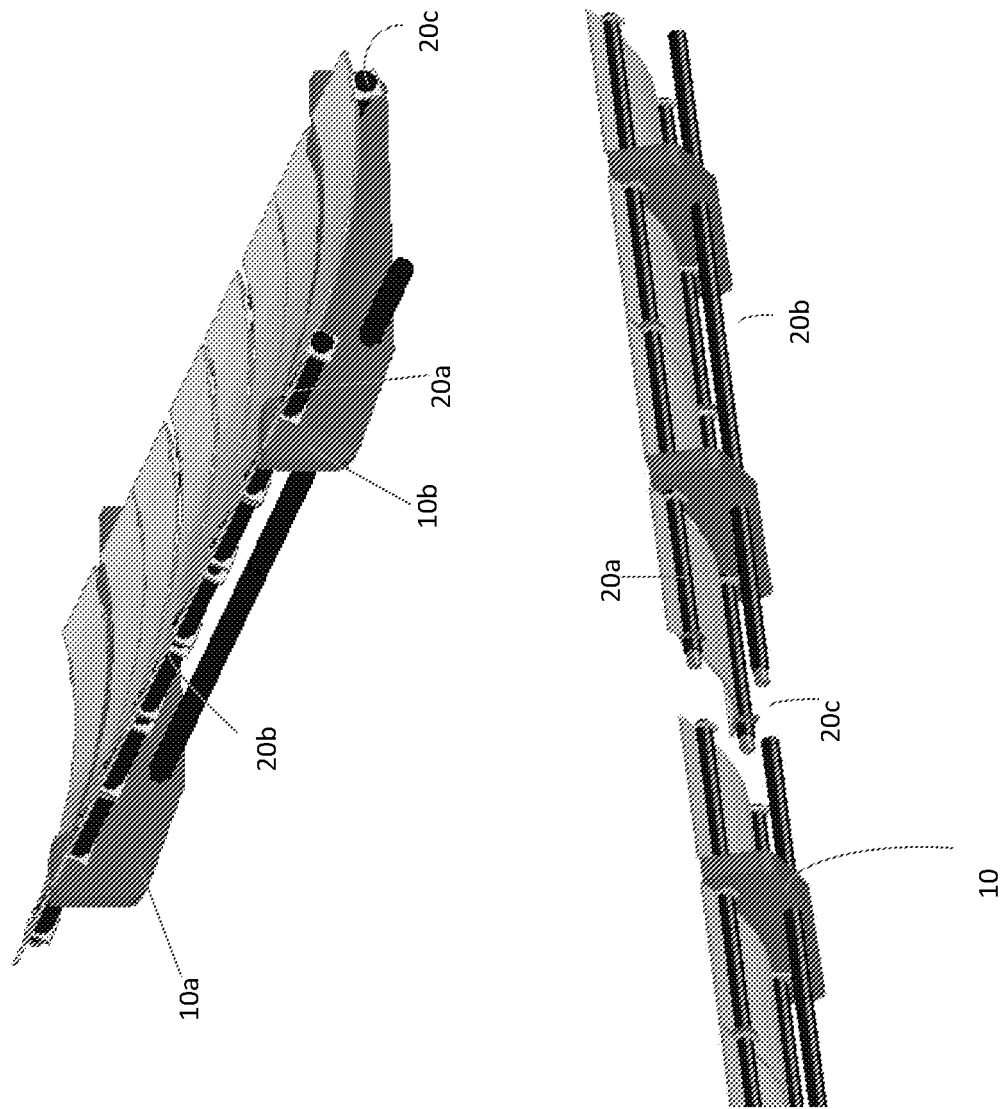

Referring to FIGS. 16A, and 16B, three support bars 20a,b,c formed of fiberglass are shown, that extend widthwise relative to the panels, passing through boreholes present in the floats 10a,b,c.

Referring to FIG. 17A, HDPE extruded pipes are added in addition to support bars 20a,b,c, to provide additional structural strength to the platform. HDPE extruded pipes 86 are oriented in parallel to the floats, and perpendicular relative to the support bars 20a,b,c.

HDPE extruded pipes 86a,b of a diameter of 90-200 mm may be used, such as Serial No. 3309000500, made by Plassim of Kibbutz Merhavia, Israel.

Referring to FIG. 17B, any number of HDPE extruded pipes 86 may be utilized, as desired, and based on the size of the entire platform 200.

Figure 18A:
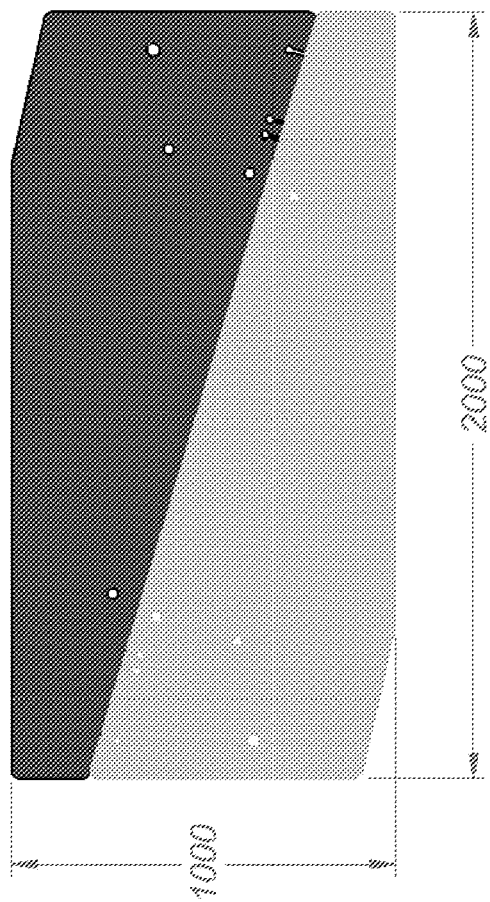
Figure 18B:
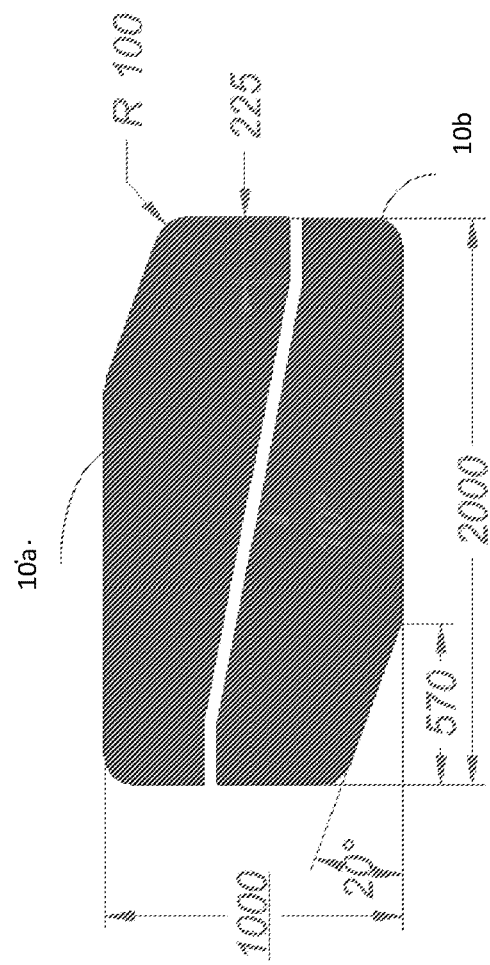
Figures 18C, 18D:
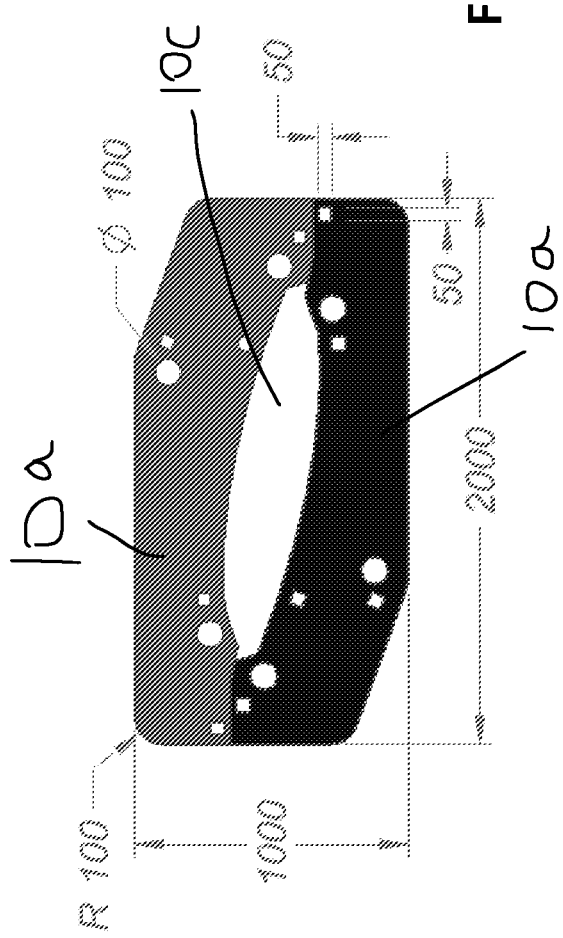

Referring to FIG. 18, various shapes and dimensions of floats formed of XLPE (closed cell cross-linked PE foam), are shown. A commercially available 1×2 meter block of XLPE, 30 may be cut to shape, using any desired tool, such as a hot wire or a waterjet cutter, to obtain two opposing floats 10a, 10b, (as shown in FIGS. 18A, 18B, 18D). Alternatively, a block may be cut into three as in FIG. 18C, to obtain two opposing floats 10a, 10b, and a small end-float 10c. In FIG. 18, PA45 "Palfoam" was used, manufactured by Palziv of Kibbutz Ein Hanatziv, Israel.

The closed cell PE foam selected may have various densities, such as 30-100 kg/m². A presently preferred density is 45 kg/m².

Referring to FIG. 19, the thickness of the closed cell PE foam floats 10a,b may vary, depending on the weight of the panels. In FIG. 19, thickness is shown as 210 mm, for PA45 "Palfoam"; a thickness of 150 mm-400 mm is presently preferred. Thicker floats may be utilized if desired.

Electrical components for solar energy utilization from panels, are provided by utilizing "SolrEdge" components manufactured by SolarEdge Technologies Inc., as follows:

StorEdge inverter, with StorEdge Connection Unit. The inverter manages battery and system energy, in addition to its traditional functionality as a DC-optimized PV inverter; for High Power; The StorEdge Connection Unit, located at the bottom of the inverter, provides connectivity to other system components, and includes a DC Safety Switch. The SolarEdge Electricity Meter—The meter is used by the inverter for export/consumption readings, and for Smart Energy Management applications, such as: export limitation, time of-use profile programming and maximizing self-consumption.

The Battery—A DC coupled battery designed to work with the SolarEdge system.

Table 1 includes an example of specifics of materials and dimensions of elements utilized, according to one embodiment of the invention.

TABLE 1

MATERIAL RANGE OF EACH COMPONENT

| Item | Min. Thickness (mm) | Material/Coating | Placement (Shore/Submerged/Above Water Line/Lakebed = Seabed)' |
|---|---|---|---|
| Side Anchor | 7 | ST37/Heat Galvanized | Shore/Lakebed-To a depth up to 3M |
| Polymeric Mooring Line | 4 | uhmwpe rope | Shore/Submerged |
| Anchor Stiff Members | 8 | SS - 304/316 | Shore/Submerged |
| Central Float | 200 | PA45 Palziv (MDPE) | Submerged |
| Connector to Float Base | 2 | Rod PVC | Above Water |
| Floating Walkway and Dock Frame | 80 | PANELLO (Palziv – MDPE + HDPE) | Submerged |
| Aluminum Clasp connecting panels to floats | 2 | AL -6063 | Above Water |
| Aluminum Support Rods | 1.5 | AL -5052 | Above Water |
| Anchor Clasp for Docking | 2 | SS - 304/316 | Above Water |
| Supplementary Support Rods for Dock and Frame | 4 | GRP Polyester | Submerged |
| Walkway Frame | 2 | SS - 304/316 | Submerged |
| Solar Panel (Double Glass)( | 2 | Glass with Alum. Frame | Above Water |
| DC Cables and Grounding Cables | 4 | Copper Cables coated with 0.5 mm Insulation | Above Water |
| Switch RSD (SOLAREDGE) | 4 | Anodized Alum. | Above Water |
| Solar Electrical Connector Cables (MC4) | 1 | Plastic Injection molded | Above Water |
| corrugated pipe | 0.5 | Cobra HDPE | Above Water |
| Electrical Grounding Elements | 5 | Copper Cables coated with 0.5 mm Insulation | Above Water |

Referring to FIG. 20, sprinkler heads 88 and water pipe 90 were included for automatic periodic spraying of the panels to remove dust and bird droppings.

Referring to FIGS. 21-22, underside of panels and floats are shown in perspective view (FIG. 21) and in closeup (FIG. 22). As best shown in FIG. 22, multiple electrical cables 34a,b,c,d carrying current from the panels towards the shore, may be slotted in appropriate slots upon spacers 92a, 92b, which are attached beneath the panel supports. Additionally, float 10 includes slots 94 for accepting electrical cables, upon upper rear wall of float 10.

Referring to FIG. 23, showing underside of panels (with panel reflection shown upon water surface), multiple slots 94 for accepting electrical cables are shown in the upper face of the float 10.

Figure 28:
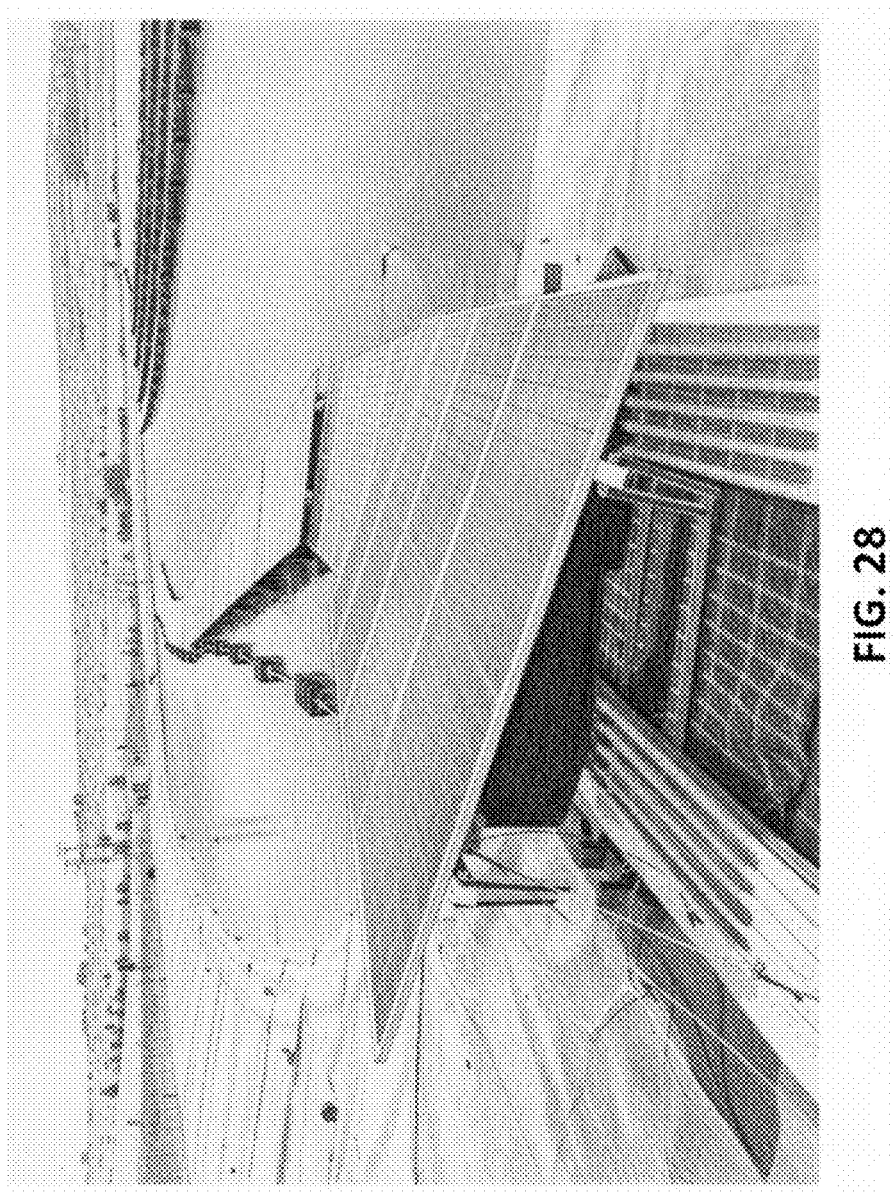

Referring to FIG. 24-28, onsite construction of modular units and their deployment as a unified solar energy platform upon a freshwater lake. As shown in FIGS. 28, units are deployed onto the lake from aluminum ramps 96.

Referring to FIG. 29, periodic servicing of the platform is done by service personnel using a personal raft. Sufficient spacing between the rows, and sufficient height of the floats allows personnel to reach all areas, including under panels to access electrical cables as necessary.

FIGS. 30-33 illustrate the platform of the invention from various views.

Figure 31:
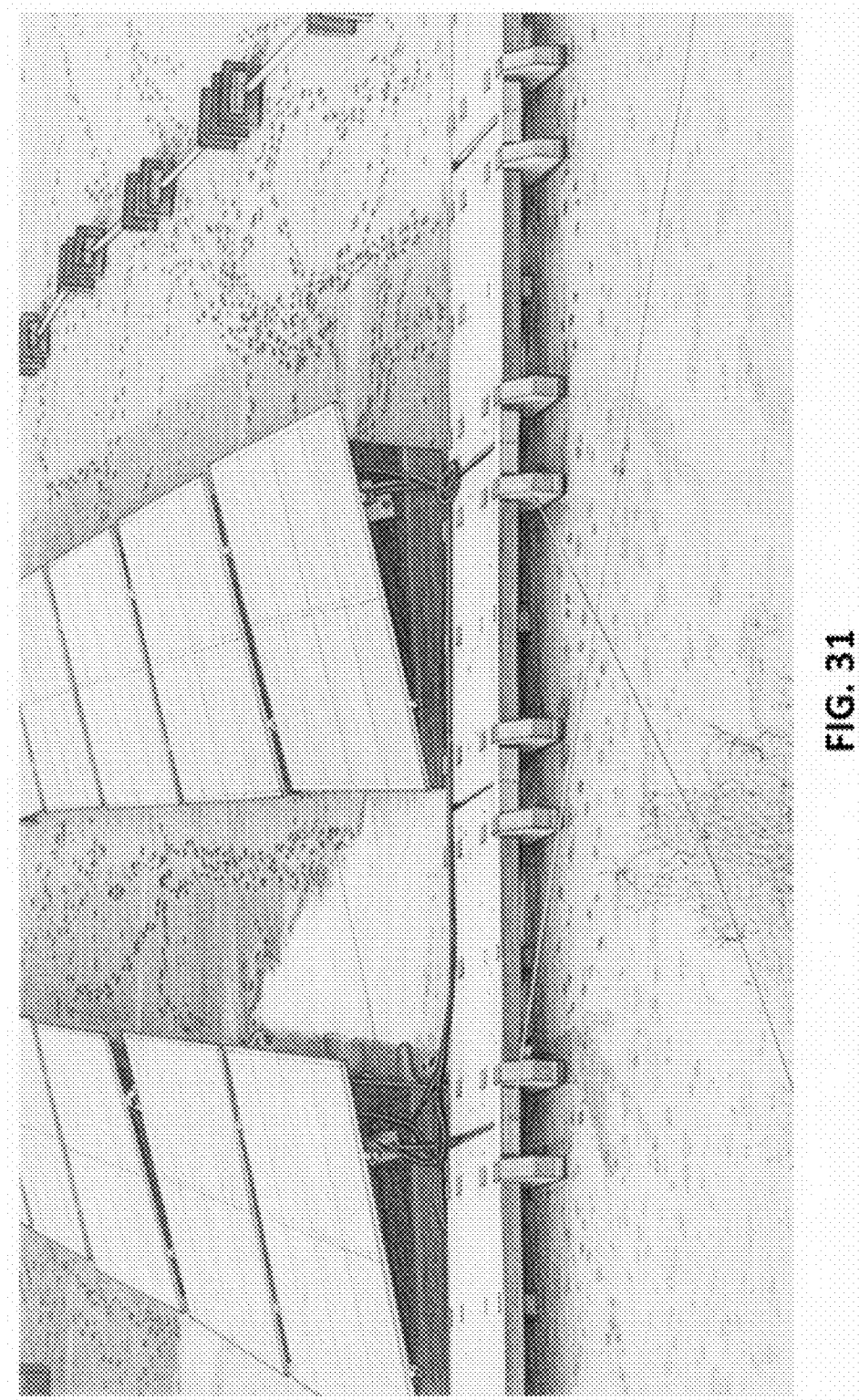
Figure 32:
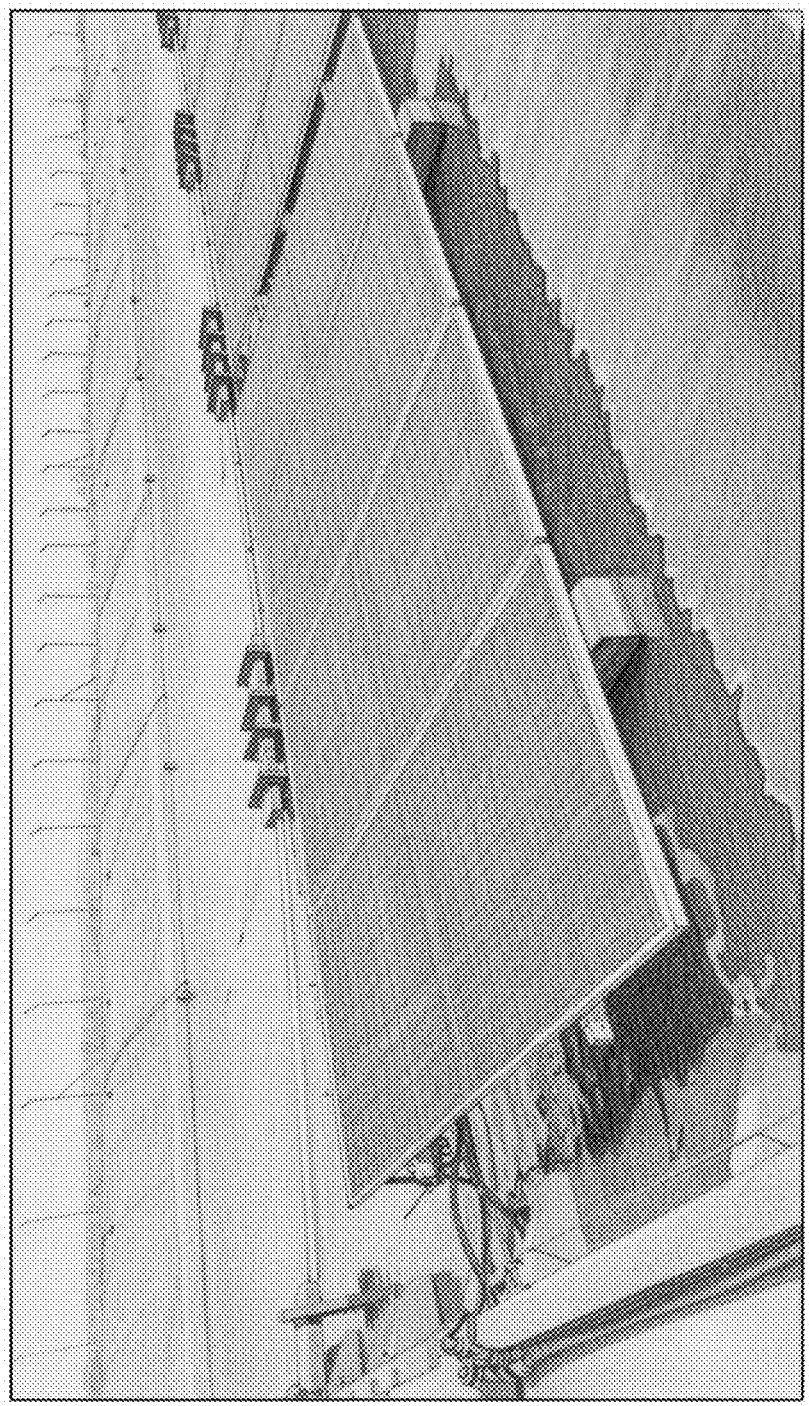
Figure 33:

Referring to FIGS. 34 and 31, in some embodiments, the modular units of the invention may be deployed on rooftops (FIG. 34) or in agricultural fields (FIG. 31), without significant changes to the structure. Advantages include: the invention may be anchored to the building frame rather than to the roof itself. In deployment in agricultural fields, the modular units are light weight and therefore easily transferable when the area is needed for crops growth. The modular units may be anchored to the periphery of the field. The closed cell foam float material acts a soft base to enable placement over various rough and uneven surfaces (including stones and debris) without puncture.

Referring to FIG. 35, an alternative two-part float is shown, formed of blow molding, injection molding or press molding, using HDPE as the float material. The float is supported by a rigid float frame. The two-part floats are welded onsite, using thermal lamination or plastic heat welding or electro fusion.

Referring to FIG. 36, alternative U-clamps are shown at right, in which a single lengthened U-Clamp 18e replaces the pair of U-clamps shown in previous embodiments (18a,b shown at left). The material for U-clamps may be selected from: aluminum, stainless steel, injection molded or press molded HDPE.

In strong winds the PV panels drag force acts as a flat plate on the floats counter to the floater shape and harnessing links to rock over until a steady force balance achieved by lowering the angel of inclination thus lowering the overall tension on the anchoring cables.

The rocking effect occurs if the wind blows in any direction due to the relative position of the harnessing point to the PV panel face in each direction.

Referring to FIG. 37, mooring lines and harnesses are shown that anchor the platform against winds (outside the solar field).

Referring to FIG. 38, shows a flat plate force lift and drag coefficients getting smaller as the inclination of the plate to the horizon.

Referring to FIG. 39, shows the harnessing connector tie to the 8 shaped ring. Where the connector acts as weight and the tie can be fixed to the rope easily without wearing the rope or the bottom cover of the reservoir.

Referring to FIG. 40 illustrates a sideview of a single modular unit 100, that forms the floating platform of the invention.

In 40A The acting loads and constraints cause a balancing rocking movement when a strong North wind acts on the unit (if the unit is located in the northern hemisphere).

- 10—solar photovoltaic panel array area subjected to a north wind.
- 20a—North wind force
- 20b—submerged hull
- 20f—submerged hull center of buoyancy B
- 20c—heeling moment
- 20d—gravity force
- 20e—center of mass M
- 20f—lifting force
- 30—water surface
- 40c—anchoring cable (south-north direction)
- 40b—down wind anchoring
- 40a—up wind anchoring
- 50a—solar panel system harnessing connector
- 50b—anchoring cable harnessing connector
- 50c—flexible harness cable/link between the solar panel system and the anchoring cable In 40b the modular unit of the invention rocks to a steady state, lower inclination in response to a North wind force.

In 40c The acting loads and constraints cause the balancing rocking movements when a strong South wind acts on the unit (if located in the northern hemisphere).

- 10—solar photovoltaic panel array area subjected to north wind
- 20a—North wind force
- 20b—submerged hull
- 20f—submerged hull center of buoyancy B
- 20c—heeling moment
- 20d—gravity force
- 20e—center of mass M
- 30—water surface
- 40c—anchoring cable (south North direction)
- 40b—down wind anchoring
- 40a—up wind anchoring
- 50a—solar panel system harnessing connector
- 50b—anchoring cable harnessing connector
- 50c—flexible harness cable/link between the solar panel system and the anchoring cable In 40d the modular unit of the invention rocks to a steady state lower inclination, in response to South wind force.

Referring to FIG. 41 illustrates a sideview of a single modular unit 100, that forms the floating platform of the invention In 41A a third float 200 is installed parallel to the support bar.

FIG. 42 illustrates a sideview of a single modular unit 100, that forms the floating platform of the invention.

In 42A a third floater installed parallel to the support bar between two units

Having described the invention with regard to certain specific embodiments thereof, it is to be understood that the description is not meant as a limitation, as further modifications will now become apparent to those skilled in the art, and it is intended to cover such modifications as are within the scope of the appended claims.

The invention claimed is:

1. A floating platform for solar panel arrays, comprised of: a plurality of modular units comprising:
a photovoltaic solar panel array;
at least two essentially triangular floats, having an angled upper side, for supporting said photovoltaic solar panel array at an angle; said essential triangular floats have sidewalls parallel to one another; and wherein the length of said sidewalls exceeds the width of said angled upper side of said essentially triangular floats, wherein said essentially triangular floats are made of cross-linked closed cell foam having a foam density of about 30-100 kg/m$^3$;
support bars connected above said essentially triangular floats and perpendicular to said angled upper side of said essentially triangular floats, supporting said photovoltaic solar panel array above said essentially triangular floats: and:
U-clamps connect said support bars to said essentially triangular floats: wherein said U-clamps comprise parallel sides connected by a center bar;
and wherein at least one of the U-clamps straddle at least one of the essentially triangular floats, such that each of the parallel sides of the at least one U-clamp is attached to a sidewall of the respective at least one essentially triangular float, said center portion of the at least one U-clamp is positioned above the angled upper side of the respective at least one essentially triangular float.

2. The floating platform of claim 1, wherein the underside of said essentially triangular floats is angled or rounded to allow said essentially triangular floats to rock upon water.

3. The floating platform of claim 1, wherein said essentially triangular floats are made of polyethylene foam.

4. The floating platform of claim 3, wherein said foam is XLPE foam.

5. The floating platform of claim 1, wherein said essentially triangular floats further comprise a laminate coating as an external layer of said essentially triangular floats.

6. The floating platform of claim 1, wherein said U-clamps are formed of a material selected from: stainless steel, aluminum, and HDPE.

7. The floating platform of claim 1, wherein said U-clamps are secured to said essentially triangular floats by lengthened pins that enter drillholes present in said essentially triangular floats.

8. The floating platform of claim 1, wherein said support bars are formed of a material selected from: aluminum, fiberglass (GRP), HDPE extruded pipe, and wood.

9. The floating platform of claim 1, wherein said modular units are spaced apart from one another and linked to one another, via a loose linkage that allows independent movement of said modular units relative to one another in response to wind or waves.

10. The floating platform of claim 9, wherein said loose linkage comprises bumpers of flexible shock-absorbing material.

11. The floating platform of claim 10, wherein said bumpers connect at least two of said support bars that support said photovoltaic solar panel array.

12. The floating platform of claim 1, wherein said solar photovoltaic panel arrays are bifacial panels.

13. The floating platform of claim 1, wherein said solar photovoltaic panel arrays are flexible panels.

14. The floating platform of claim 1, wherein the photovoltaic solar panel array of each of the respective plurality of modular units comprises 1-8 solar panels.

15. The floating platform of claim 1, further comprising one or more of the following elements: spacers; small connecting rods; cross-beams for said U-Clamps; mooring lines; electrical cables; harnesses; anchors; and a walkway.

16. The floating platform of claim 1, wherein the angle of the photovoltaic solar panel array of each of the respective plurality of modular units relative to the horizon is 5-40°.

17. The floating platform of claim 1, further comprising electrical components for utilization of solar energy from the photovoltaic solar panel array of each of the respective plurality of modular units, said elements comprising: an inverter; a DC coupled battery; a DC switch, and an electricity meter.

18. The floating platform of claim 1, wherein said floating platform is deployable upon at least one of: a body of water; a roof; and a field.

19. The floating platform of claim 1, wherein said floating platform is harnessed to anchoring cables via two mooring lines.

20. The floating platform of claim 19, wherein said mooring lines are connected to said support bars.

21. The floating platform of claim 1, further comprising a lower support bar.

22. The floating platform of claim 21, further comprising anchoring cables connected to said lower support bar.

23. The floating platform of claim 1, wherein a third float is placed between a pair of the at least two essentially triangular floats; said third float is similar in size and shape to said pair of essentially triangular floats.

24. The floating platform of claim 23, wherein said third float is parallel to the support bars.

25. The floating platform of claim 1, wherein a third float is placed between two of said modular units of the plurality of modular units, wherein said third float is oriented parallel to the support bars.

26. The floating platform of claim 16, wherein the angle of the photovoltaic solar panel array of each of the respective plurality of modular units relative to the horizon is 12-18°.

* * * * *